(12) United States Patent
Beaurepaire

(10) Patent No.: US 11,287,280 B2
(45) Date of Patent: Mar. 29, 2022

(54) METHOD AND APPARATUS FOR PROVIDING A RECOMMENDED VEHICLE PARKING OR STOPPING LOCATION BASED ON A NEXT DESTINATION

(71) Applicant: HERE GLOBAL B.V., Eindhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 337 days.

(21) Appl. No.: 16/261,152

(22) Filed: Jan. 29, 2019

(65) Prior Publication Data

US 2020/0240808 A1 Jul. 30, 2020

(51) Int. Cl.
*G01C 21/34* (2006.01)
*G01C 21/36* (2006.01)

(52) U.S. Cl.
CPC ....... *G01C 21/3685* (2013.01); *G01C 21/343* (2013.01); *G01C 21/3461* (2013.01)

(58) Field of Classification Search
CPC .............. G01C 21/3685; G01C 21/343; G01C 21/3461; G01C 21/3438; G08G 1/143; G08G 1/144; G08G 1/096816; G08G 1/147
See application file for complete search history.

(56) References Cited

U.S. PATENT DOCUMENTS

| | | | |
|---|---|---|---|
| 7,788,026 B2 | 8/2010 | Mueller | |
| 8,306,734 B2 | 11/2012 | Mathews | |
| 8,791,838 B2 | 7/2014 | Scofield et al. | |
| 9,377,319 B2 | 6/2016 | San Filippo et al. | |
| 9,639,994 B2 | 5/2017 | Beaurepaire | |
| 9,689,693 B2 | 6/2017 | Newlin et al. | |
| 10,837,788 B1* | 11/2020 | Kentley-Klay | G06T 19/006 |
| 2004/0128066 A1 | 7/2004 | Kudo et al. | |
| 2005/0021227 A1* | 1/2005 | Matsumoto | G01C 21/3415 701/431 |
| 2006/0015397 A1 | 1/2006 | Vitrano, Jr. et al. | |

(Continued)

FOREIGN PATENT DOCUMENTS

| | | |
|---|---|---|
| CN | 107527520 A | 12/2017 |
| CN | 107609067 A | 1/2018 |

(Continued)

OTHER PUBLICATIONS

Office Action for corresponding European Patent Application No. 20154039.0-1001, dated Aug. 3, 2020, 13 pages.

(Continued)

*Primary Examiner* — Thomas Ingram
(74) *Attorney, Agent, or Firm* — Ditthavong, Steiner & Mlotkowski

(57) ABSTRACT

An approach is provided for recommending a vehicle parking or stopping location at a current destination based on a next destination. The approach, for example, involves determining the next destination that follows the current destination. The approach also involves processing map data representing a road network within a proximity threshold of the current destination to determine the recommended parking or stopping location based on minimizing a travel time, a travel distance, or a combination thereof between the recommended parking or stopping location and the next destination.

18 Claims, 18 Drawing Sheets

(56) References Cited

U.S. PATENT DOCUMENTS

| | | | |
|---|---|---|---|
| 2013/0268187 A1 | 10/2013 | Scofield et al. | |
| 2014/0052373 A1 | 2/2014 | Hoch et al. | |
| 2014/0172292 A1* | 6/2014 | McGee | G01C 21/3605 |
| | | | 701/418 |
| 2014/0278081 A1* | 9/2014 | Iwuchukwu | G01C 21/3679 |
| | | | 701/519 |
| 2014/0285361 A1* | 9/2014 | Tippelhofer | G08G 1/143 |
| | | | 340/932.2 |
| 2015/0219464 A1* | 8/2015 | Beaurepaire | G01C 21/3438 |
| | | | 701/538 |
| 2016/0027306 A1* | 1/2016 | Lambert | G08G 1/202 |
| | | | 701/117 |
| 2016/0209845 A1* | 7/2016 | Kojo | G05D 1/0088 |
| 2017/0074669 A1* | 3/2017 | Newlin | G01C 21/3423 |
| 2017/0370734 A1* | 12/2017 | Colijn | G08G 1/205 |
| 2018/0107222 A1* | 4/2018 | Fairfield | H04W 4/029 |
| 2018/0357907 A1* | 12/2018 | Reiley | H04W 4/44 |
| 2019/0063947 A1* | 2/2019 | Beaurepaire | G01C 21/3476 |
| 2020/0082323 A1* | 3/2020 | Heise | G06Q 10/083 |
| 2020/0192363 A1* | 6/2020 | Landy | G06Q 10/06315 |

FOREIGN PATENT DOCUMENTS

| | | |
|---|---|---|
| CN | 108332765 A | 7/2018 |
| JP | 2011075392 A | 4/2011 |
| JP | 2013007608 A | 1/2013 |
| WO | 2012130388 A1 | 10/2012 |

OTHER PUBLICATIONS

Office Action for related European Patent Application No. 20154039.0-1001, dated Jun. 15, 2020, 8 pages.

"Route4Me Route Planner", retrieved on Jan. 29, 2018 from https://play.google.com/store/apps/details?id=com.route4me.routeoptimizer&hl=en, 6 pages.

Office Action for related European Patent Application No. 20 154 039.0-1001, dated Dec. 26, 2021, 5 pages.

\* cited by examiner

100

681

METHOD AND APPARATUS FOR PROVIDING A RECOMMENDED VEHICLE PARKING OR STOPPING LOCATION BASED ON A NEXT DESTINATION

BACKGROUND

Providing navigation support to users is an important function for map service providers. Modern devices such as sophisticated navigation and communication systems can enable users or drivers of vehicles to have a better understanding of what is ahead or approaching on a road or route. For example, finding parking spaces can be difficult in certain areas, and therefore, systems that can provide information on parking guidance for upcoming destinations can be an important function for map service providers. However, providing parking support information at a current destination can be technically challenging particularly when attempting to optimize travel time, distance, etc. for a user's drive or trip that may continue onto a next destination (e.g., a return trip home or travel to a subsequent location).

SOME EXAMPLE EMBODIMENTS

As a result, there is a need for providing a recommended vehicle parking or stopping location based on a next destination.

According to one embodiment, a computer-implemented method for computing a recommended vehicle parking location and/or stopping location (e.g., a pick-up location, a drop-off location, etc.) at a current destination based on a next destination comprises determining the next destination that follows the current destination. The method also comprises processing map data representing a road network within a proximity threshold of the current destination to determine the recommended vehicle parking and/or stopping location based on minimizing a travel time, a travel distance, or a combination thereof between the recommended vehicle parking and/or location and the next destination.

According to another embodiment, an apparatus for computing a recommended vehicle parking location and/or stopping location (e.g., a pick-up location, a drop-off location, etc.) at a current destination comprises at least one processor, and at least one memory including computer program code for one or more computer programs, the at least one memory and the computer program code configured to, with the at least one processor, cause, at least in part, the apparatus to determine the next destination that follows the current destination. The apparatus is also caused to process map data representing a road network within a proximity threshold of the current destination to determine the recommended vehicle parking and/or stopping location based on minimizing a travel time, a travel distance, or a combination thereof between the recommended vehicle parking and/or location and the next destination.

According to another embodiment, a non-transitory computer-readable storage medium for computing a recommended vehicle parking location and/or stopping location (e.g., a pick-up location, a drop-off location, etc.) at a current destination carries one or more sequences of one or more instructions which, when executed by one or more processors, cause, at least in part, an apparatus to determine the next destination that follows the current destination. The apparatus is also caused to process map data representing a road network within a proximity threshold of the current destination to determine the recommended vehicle parking and/or stopping location based on minimizing a travel time, a travel distance, or a combination thereof between the recommended vehicle parking and/or location and the next destination.

According to another embodiment, an apparatus for computing a recommended vehicle parking location and/or stopping location (e.g., a pick-up location, a drop-off location, etc.) at a current destination comprises means for determining the next destination that follows the current destination. The method also comprises processing map data representing a road network within a proximity threshold of the current destination to determine the recommended vehicle parking and/or stopping location based on minimizing a travel time, a travel distance, or a combination thereof between the recommended vehicle parking and/or location and the next destination.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a recommended vehicle parking location and/or stopping location based on a next destination are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
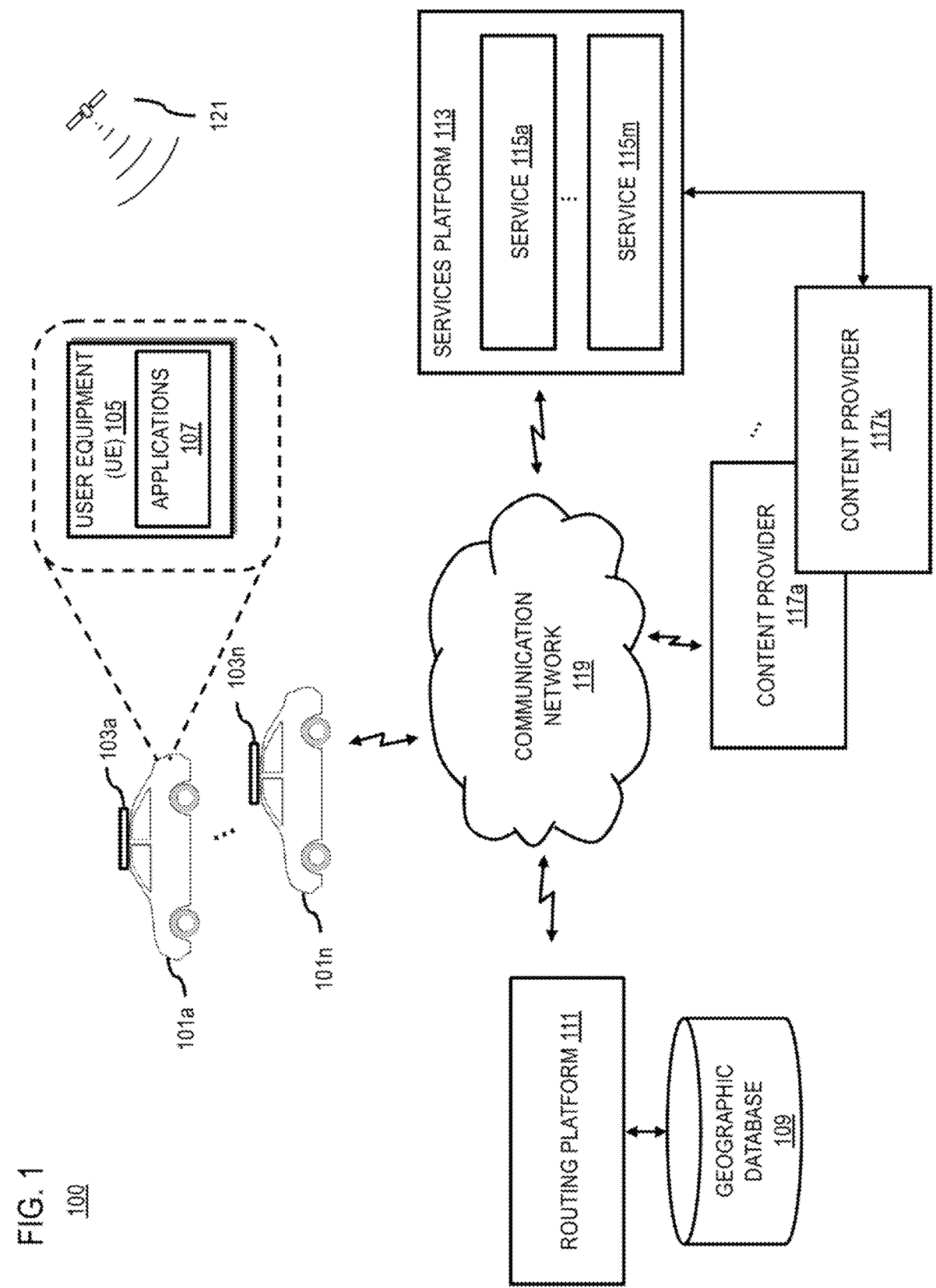
FIG. 1 is a diagram of a system capable of providing a recommended parking and/or stopping location based on a next destination, according to one embodiment.

FIG. 1 is a diagram of a system capable of providing a recommended parking and/or stopping location based on a next destination, according to one embodiment. As described above, providing navigation support (e.g., parking recommendations at a destination) to users is an important function for map service providers. By way of example, a user may be a driver of a standard vehicle (e.g., a car, a truck, a motorcycle, etc.) or shared vehicle (e.g., vehicles provided by a mobility operator), a passenger of an autonomous or highly-assisted vehicles (HAD) vehicle, a cyclist, a pedestrian, or a combination thereof. FIG. 1 represents these different types of vehicles as vehicles 101a-101n (also collectively referred to as vehicles 101) equipped with various location and/or environmental sensors 103a-103n (also collectively referred to as sensors 103). Navigation systems (e.g., an embedded car navigation system, a mobile device, etc.) can enable users to have a better understanding of what is coming ahead or approaching on a road or route on which they are traveling (e.g., upcoming parking information, POIs, complicated interchanges, traffic status, road closures, detours, etc.). These device systems and/or mobile devices are represented in FIG. 1 as user equipment 105 that can execute one or more applications 107 to provide mapping, navigation, and/or other related functions such as providing parking recommendations to assist user in finding parking spaces at their destinations.

However, in areas with complex or congested road networks (e.g., cities or urban areas such as Paris), finding parking spaces can be difficult. For example, parking "randomly" around a destination often leads to long detours when leaving a one place (e.g., a current destination or location) to drive to another one (e.g., a next destination). This can be due to any number of factors including but not limited to driving restrictions in the area (e.g., one-way streets, turn restrictions, etc.). Parking "randomly", for instance, refers to the conventional practice for a map service provider, navigation system, etc. to provide recommend or suggest parking locations that is nearest the user destination, as illustrated in FIG. 2.

Figure 2:
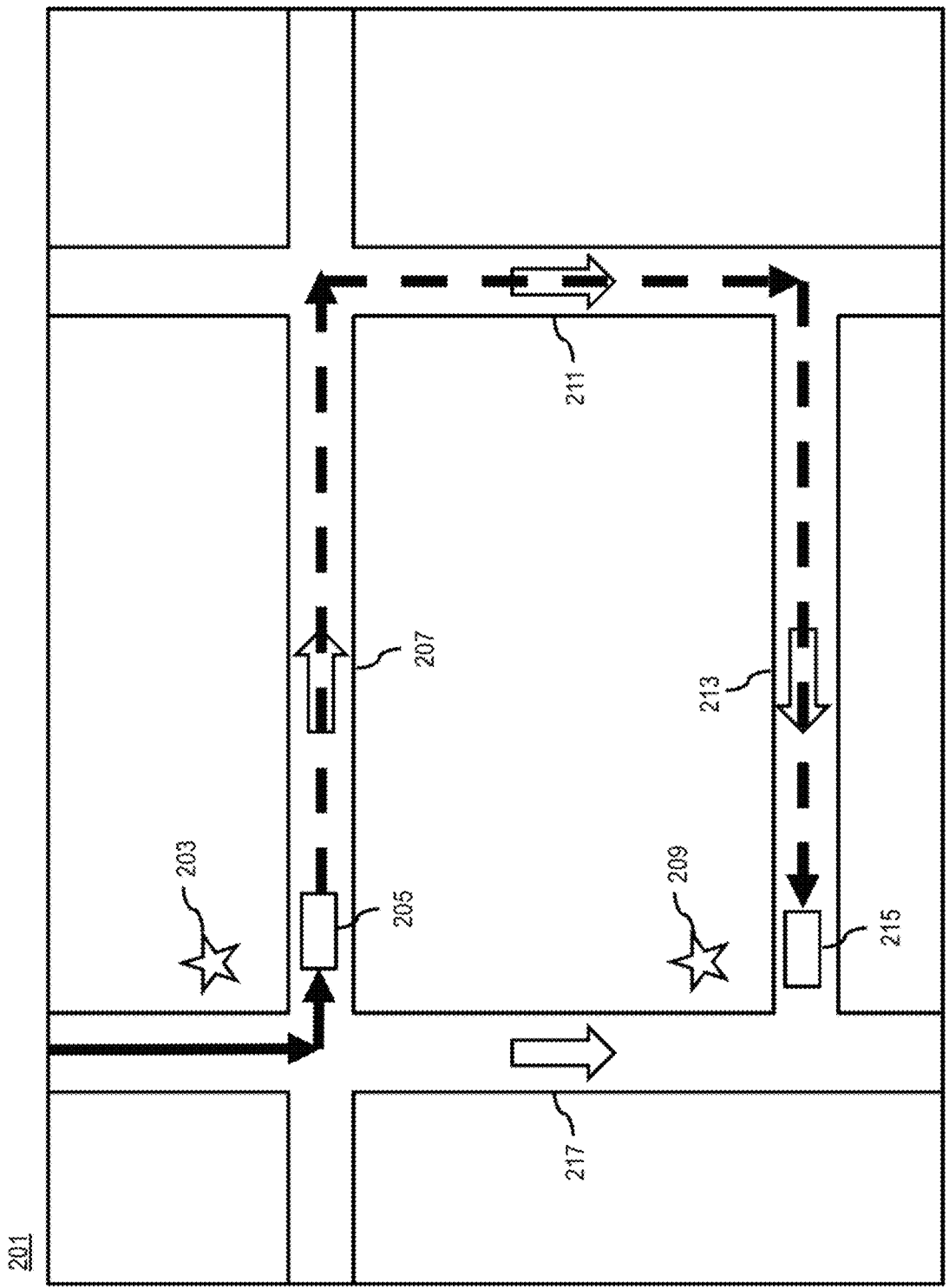
FIG. 2 is a diagram illustrating an example of vehicle parking or stopping situation that can be optimized by considering a next destination, according to one embodiment.

More specifically, FIG. 2 is a diagram illustrating an example of vehicle parking or stopping situation that can create a long detour to a next destination, according to one embodiment. In the example 201 of FIG. 2, a user has initiated a route to a destination 203 and requested a parking recommendation from the navigation system. The navigation system 100 determines that the nearest parking space 205 is on road segment 207 and presents the parking space 205 as the recommended parking location. The user proceeds to park the user's vehicle at the recommended parking space 205 and walks to the destination 203. On returning to the vehicle at the recommended parking space 205, the user wants to continue to the next destination 209. However, because the recommended parking space 205 is located on a one-way road segment 207, the navigation system determines that the only available route involves a long detour along road segments 207, 211, and 213 to the parking space 215 nearest the next destination 209 rather than a more direct route along road segment 217.

As a result, the navigation system has provided a long detour that increased travel time and travel distance, leading to a poor user experience. This parking recommendation and routing then presents a significant technical challenge to ensuring that a routing engine that provides optimized parking recommendations (e.g., parking recommendations that minimizes travel time and/or travel distance for a user). These challenges include but are not limited how to make sure the parking position suggested by the navigation system is optimized for the user's next destination and how to avoid making a large detour when going to the next destination because of the way the user pared around the first or current destination.

To address the technical problems associated with optimizing navigation routing and parking recommendations, the system 100 of FIG. 1 introduces a capability to leverage data on known or predicted next destinations (e.g., determined by manual input or a user's mobility graph that represents, for instance, the user's historical mobility data and patterns comprising GPS points or trajectories of a device associated with a person tracked over a time period) together with map data/parking availability data (e.g., as stored in a geographic database 109 or equivalent) to optimize recommended parking positions. In other words, the system 100 selects or recommends a parking or stopping location for a vehicle at a current destination that minimizes the travel time, travel distance, and/or any other routing engine cost parameter/function to the next destination. In one embodiment, the system 100 can suggest parking positions or locations which may be slightly off the route (e.g., slightly before or after the arrival at a current destination, on a parallel street, etc.) to optimize the overall trip duration, distance, etc.

Figure 3:
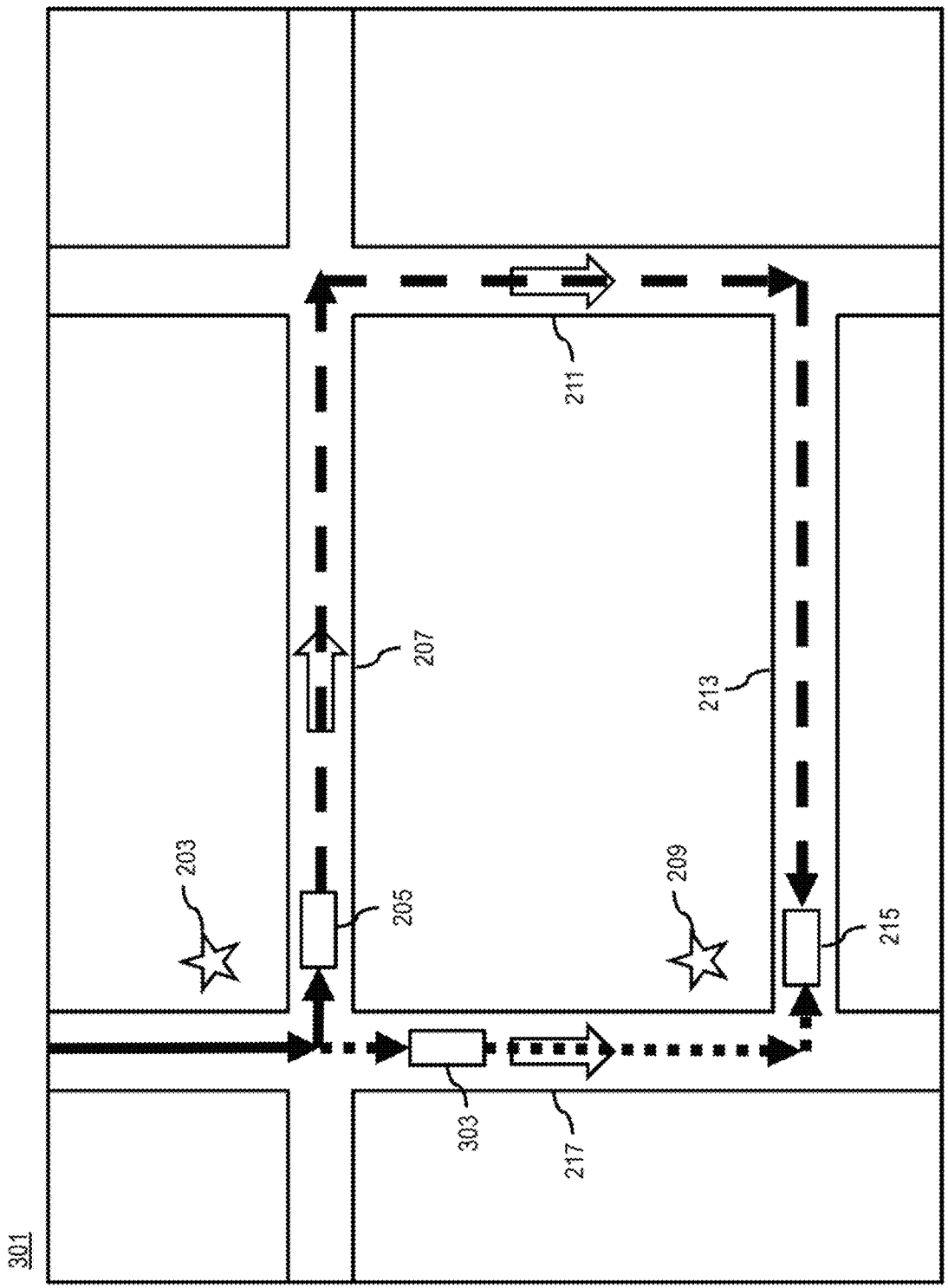
FIG. 3 is a diagram illustrating an example of optimizing a recommended parking location at a current destination based on a next destination, according to one embodiment.

FIG. 3 is a diagram illustrating an example 301 of optimizing a recommended parking location at a current destination based on a next destination, according to one embodiment. The example 301 of FIG. 3 continues the example 201 of FIG. 2 which provided a recommended parking location 205 closest to the current destination 203 but resulted in a long detour to the next destination 209. In contrast, the navigation system or routing engine of the example 301 of FIG. 3, uses the embodiments described herein to optimize parking suggestions by considering the next destination, nearby street network (e.g., turn restrictions, one-way streets, etc. indicated by map data), and/or other contextual attributes (e.g., traffic jams or other incidents, time of day, weather, user profile information, user preferences, etc.).

For example, the navigation system can identify available candidate parking locations or other vehicle stopping locations (e.g., locations for picking up or dropping off passengers) that are within a configured distance threshold of the destination. In example 301, the candidate locations include the parking location 205 on road segment 207 (e.g., as originally recommended in the example 201 of FIG. 2) that is closest to the current destination 203 and another parking location 303 on road segment 217 that is farther away from current destination 203. Then prior to the user's arrival at the current destination 203 (or when the user is within a proximity threshold of the current destination 203), the system 100 can use any routing engine known in the art to determine the travel times, travel distances, and/or any other routing cost function parameter for routes from each candidate parking location 205 and 303 to the recommended parking location 215 at the next destination 209. The system 100 can then select candidate parking location 205 or 303 with the minimum travel time, distance, etc. to present. In example 301, the navigation system determines that parking at location 303 will result in an overall faster trip to the next destination 209 than parking at location 205. This is because parking at location 303 allows the user to take a more direct route to the next destination 209 along road segment 217 versus the longer detour needed between location 205 and the next destination 209.

It is contemplated that the embodiments described herein for optimizing vehicle parking or stopping locations based on the next destination are also applicable to uses cases involving shared vehicles (e.g., cars, bicycles, scooters, etc. provided through shared vehicle services operated by mobility providers). For example, when recommending shared vehicles to users, vehicle sharing services typically recommend vehicles based on distance to the user. However, as discussed with respect to vehicle parking and/or stopping locations above, the closest vehicle location may not necessarily result in the fastest or most optimal trip for the user. This is because the closest shared vehicle may be located on a street or at a location that would result in a longer trip to the user's destination. Accordingly, when the embodiments described herein are applied to a shared vehicle use case, the system 100 can recommend the most suitable shared vehicle based on the overall time, distance, etc. to the next destination in contrast to just on proximity of the vehicle to the user.

Figure 4:
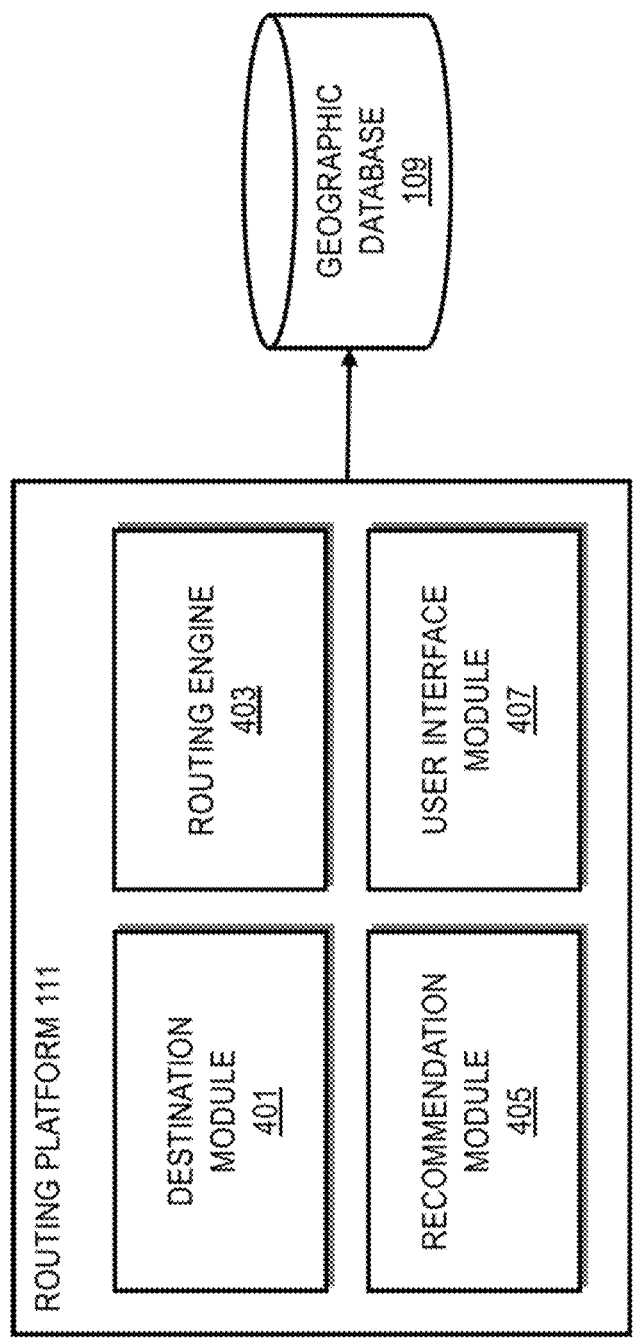
FIG. 4 is a diagram of the components of a routing platform, according to one embodiment.

In one embodiment, as shown in FIG. 4, the system 100 includes a routing platform 111 with one or more components for providing vehicle recommended parking or stopping locations at a current destination based on a next destination according to the various embodiments described herein. It is contemplated that the functions of these components may be combined or performed by other components of equivalent functionality. In this embodiment, the routing platform 111 includes a destination module 401, routing engine 403, recommendation module 405, and user interface (UI) module 407. The above presented modules and components of the routing platform 111 can be implemented in hardware, firmware, software, or a combination thereof Although shown as a separate entity in FIG. 1, it is contemplated that the routing platform 111 may be implemented as a module of any other component of the system 100 (e.g., a component of the services platform 113, services 115a-115m (also collectively referred to as services 115), vehicle 101, UE 105, etc.). In another embodiment, the routing platform 111 and/or any of modules 401-407 may be implemented as a cloud based service, local service, native application, or combination thereof. The functions of the routing platform 111 and the modules 401-407 are discussed with respect to FIGS. 3-10 below.

Figure 5:
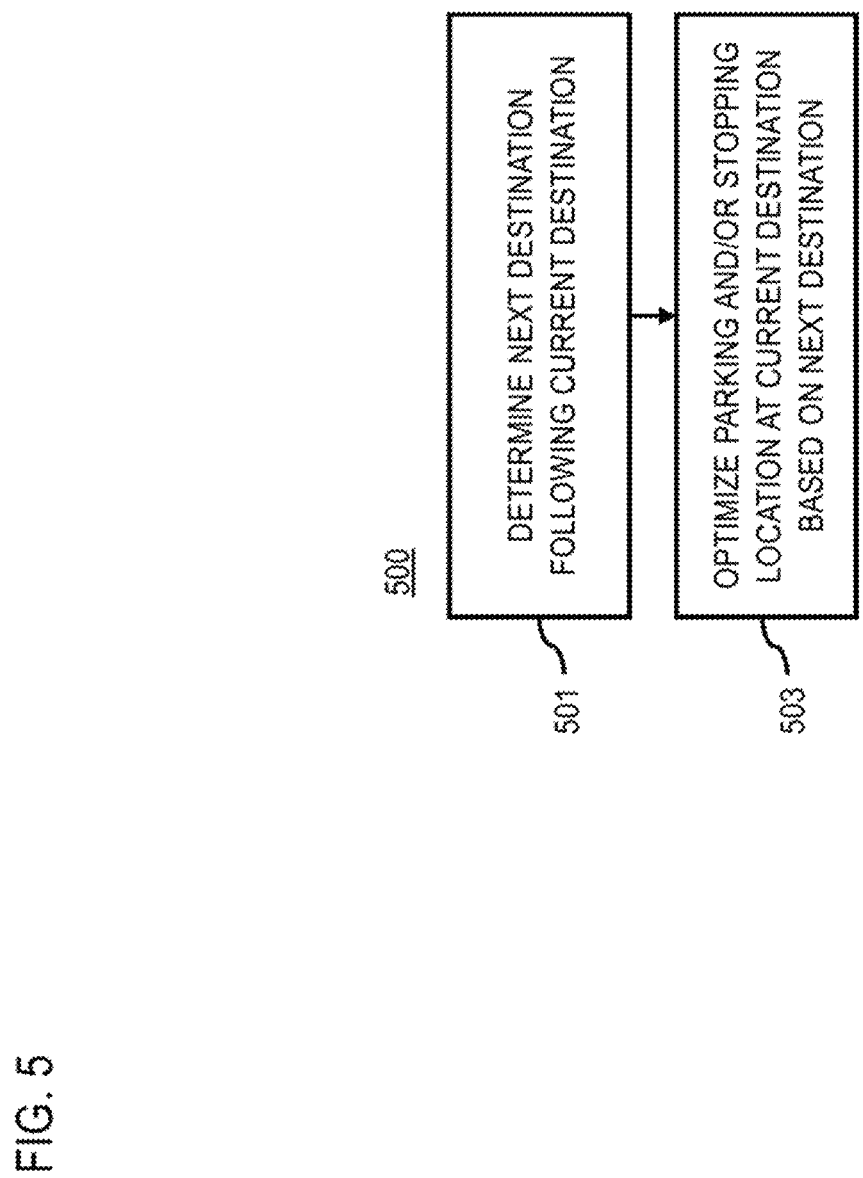
FIG. 5 is a flowchart of a process for optimizing a parking and/or stopping location based on a next destination, according to one embodiment.
Figure 13:
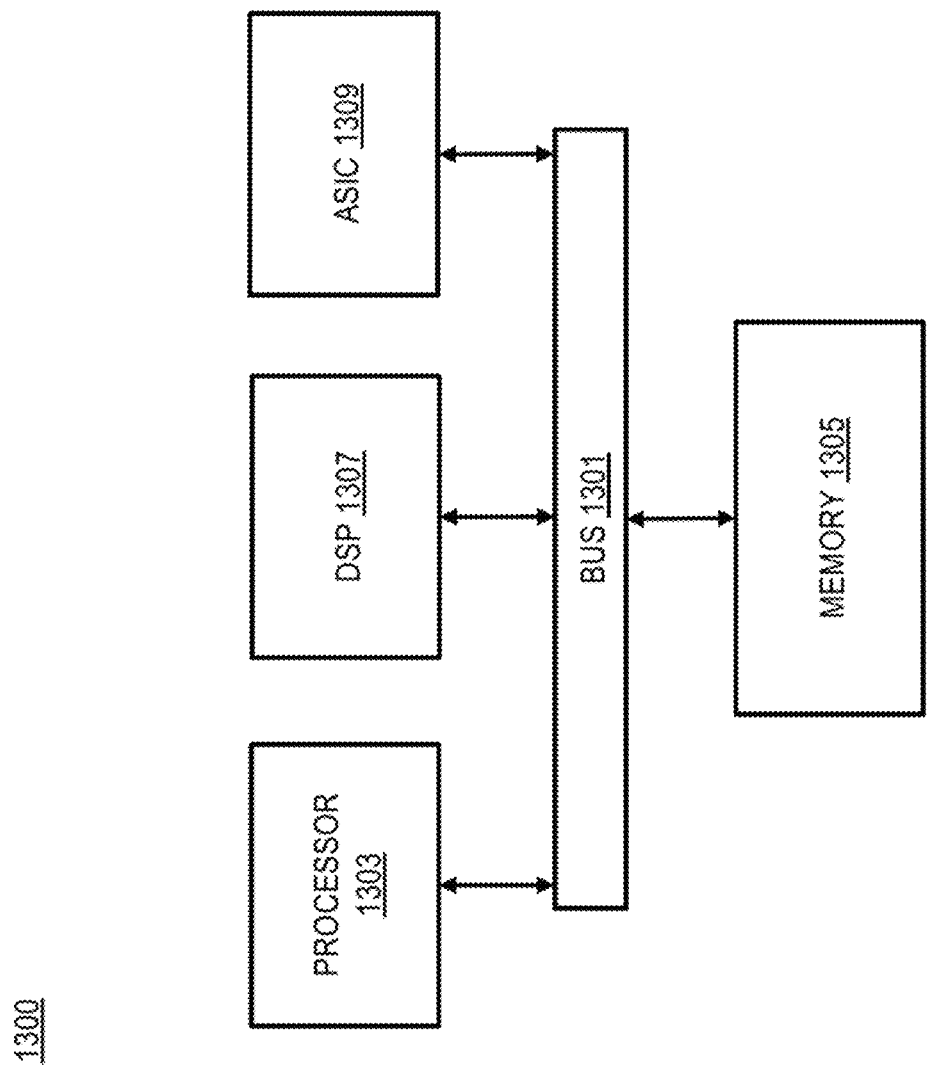
FIG. 13 is a diagram of a chip set that can be used to implement an embodiment.

FIG. 5 is a flowchart of a process for optimizing a parking and/or stopping location based on a next destination, according to one embodiment. In various embodiments, the routing platform 111 and/or any of the modules 401-407 may perform one or more portions of the process 500 and may be implemented in, for instance, a chip set including a processor and a memory as shown in FIG. 13. As such, the routing platform 111 and/or any of the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In step 501, the destination module 401 determines the next destination (or any number of subsequent locations) following a current destination specified by a user. In other words, the next destination is any location that the user wants or is predicted to travel to after reaching a current destination or location. In one embodiment, the destination module 401 can determine based on a user input, a user mobility graph, or a combination thereof. For example, the destination module 501 can present a user interface for the user to input the current and/or next destinations. In addition or alternatively, the destination module 401 can retrieve a mobility graph for a user to determine the current and/or next destinations. By way of example, a mobility graph is a data structure storing data on locations traveled or visited by a user as well as contextual parameters such as but not limited to time of visit, mode of transport, weather, activity, etc. In one embodiment, mobile devices (e.g., UE 105) often track a user's positions and behaviors in order to provide more accurate services and anticipate the user's needs and provide related services. The mobility graph, for instance, can be generated based on this mobile device tracking data or equivalent.

In one embodiment, the mobility graph can be used to predict or otherwise determine where the user will go next. For example, if the mobility graph indicates that the user parks near work every weekday morning at 8:00 am then returns home directly from work every weekday afternoon at 5:00 pm, the destination module 401 can predict that if the user has set a destination for work on a weekday morning, the likely next destination will be the user's home leaving at 5:00 pm.

In step 503, the recommendation module 405 interacts with the routing engine 403 to optimize a vehicle parking and/or stopping location at the current destination or location based on the determined next destination. While the various embodiments described herein are generally discussed with respect to determine a parking location for a user's vehicle based on the next destination, it is contemplated that the embodiments are also applicable for determining a stopping location for a user vehicle. For example, a stopping location can be determined based on the next destination when the vehicle is picking up or dropping off passengers at the stopping location before heading to the next destination. In other cases, the stopping location can be service locations (e.g., fueling locations, locations for accessing services, points of interest, and/or any other location that is an intermediate stop before a next destination).

In one embodiment, to optimize the vehicle parking and/or stopping location, the recommendation module 405 can consider any combination of the following parameters such as but not limited to:

Data on the street network within a proximity threshold of the current destination (e.g., determined from map data stored in the geographic database 109). For example, parking on a one-way street where turn over is not allowed may be sub-optimal if the next destination is in the opposite direction.

Data on the direction of parking (e.g., determined from map data stored in geographic database 109). For example, due to turn restrictions, sometimes only arriving in the right direction (e.g., the same direction) in the destination street plays a role to optimize the route to the next destination.

The optimal parking or stopping location may occur before the destination is reached. Accordingly, in one embodiment the proximity threshold applied by the recommendation module 405 can encompass areas before and/or after reaching the destination.

Data on distance to be walked can also be a parameter when determining an optimal parking or stopping location. For example, the recommendation module 405 can perform optimizations based on whether the user's profile and/or preferences data indicates that the user is ready to walk a configured distance (e.g., 200-300 meters), which can save time later on when driving in traffic to the next destination. In one embodiment, additional context such as activity, cargo, number of passengers, etc. can be used to determine the distance that is to be walked (e.g., traveling with cargo or children can decrease the distance, while traveling alone can increase the distance).

In one embodiment, to consider the parameters above, the recommendation module 405 identifies candidate parking locations (e.g., specific parking spaces and/or road segments that include parking spaces). The recommendation module 405, for instance, can retrieve parking availability data (e.g., real-time and/or historical parking availability data stored in the geographic database 109) to identify candidate parking locations that may be available at the current destination. In one embodiment, the parking availability or candidate parking/stopping locations can be determined based on user context (e.g., expected time of travel, time at destination, time to leave destination for the next destination, traffic incidents, weather, etc.). The candidate parking locations can then be provided to routing engine 403 (e.g., any navigation routing engine known in the art or equivalent) to determine a route (e.g., sequence of road segments to traveled between each candidate parking/stopping location and the next destination) and related travel times, distances, etc.

The recommendation module 405 can then use any rule or criteria to select a recommended vehicle parking and/or stopping location from among the candidate locations based on the determined travel times, distances, etc. and/or any of the parameters discussed above. For example, if the routing engine 403 determines that the candidate or recommended parking location is on a one-way road segment, the recommendation module 405 can select that parking or stopping location to recommend based on determining that the one-way road segment has a direction of travel that leads towards the next destination or otherwise has a determined travel time, distance, etc. to the next destination less than other candidates. In one embodiment, the recommendation module 405 can determine whether the road segment leads towards the destination by determining whether the segment's direction of travel is within a threshold angular range of a direct line from the parking location to the next destination.

In another example, the recommendation module 405 can select the recommended parking location based on determining that the candidate or recommended parking/stopping location has a direction of parking (e.g., the direction that the front of the vehicle is pointed to when the vehicle is parked) that also leads to the next destination (e.g., based on determining whether the direction leads based on the criteria discussed above or equivalent).

In another embodiment, the recommendation module 405 can use the walking distance parameter to select the recommended parking/stopping location. As discussed above, a maximum walking distance between a parking location and the current destination can be used to determine what candidate parking locations to evaluate for routing to the next destination. The recommendation module 405 can simply apply a maximum threshold as a selection cut-off value where all locations beyond the threshold are eliminated and all locations under the threshold are considered equally. In other cases, the recommendation module 405 can use the routing engine 403 to determine walking times, distances, routes, etc. between the candidate parking locations and the current destination and then add this time to the overall travel time to next destination to optimize the overall route.

In another embodiment, the recommendation module 405 can determine whether the routes between the candidate parking locations and the next destination have any turn restrictions that would result in the increased travel times or distances. For example, if a route between a candidate parking location and the next destination has no left turns or U-turns allowed, the length of the route may be increased. Accordingly, the recommendation module 405 can select recommended parking locations whose routes to the next destination minimizes or avoids such turn restrictions.

In yet another embodiment, the recommendation module 405 can interact with the routing engine 403 and geographic database 109 to determine whether there are any traffic incidents or other real-time incidents that can potentially delay travel between candidate parking locations and the next destination. For example, even when a parking location is determined that would normally have the shortest route or travel distance to the next destination, if a traffic accident is occurring on that route and would cause a delay so that another parking location would take less travel time, the recommendation module 405 can then select that parking location over the one with the shortest route to recommend.

In one embodiment, the UI module 407 can present the recommended parking location in a user interface of a device (e.g., UE 105, navigation system or other display of the vehicle 101, etc.). The user interface, for instance, can include a representation of the travel distance, travel time, or a combination thereof to the next destination from the recommended parking location, one or more other parking locations, or a combination thereof.

Figure 6A:
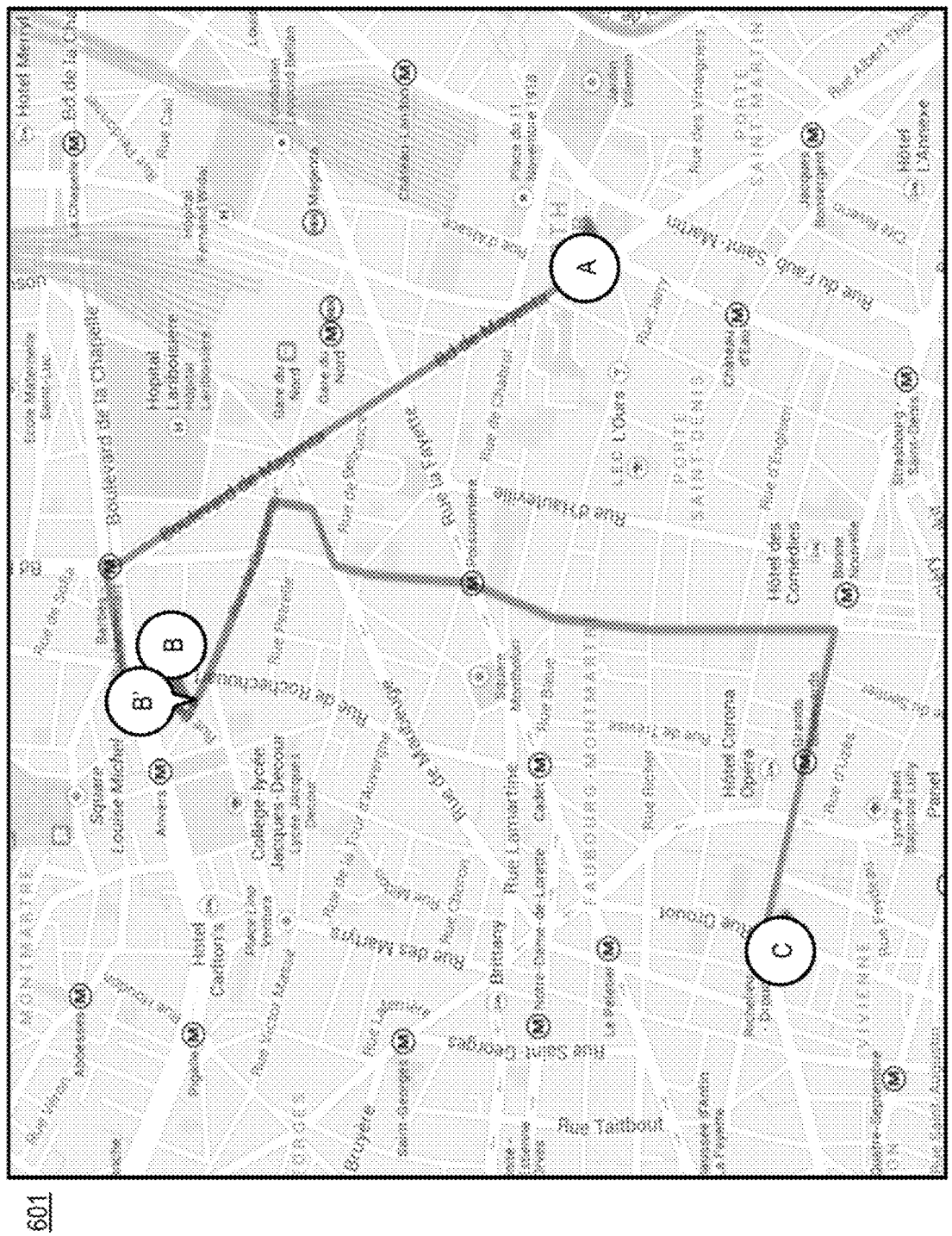
FIGS. 6A-6E are diagrams of example user interfaces associated with the process of FIG. 5, according to one embodiment.
Figure 6B:
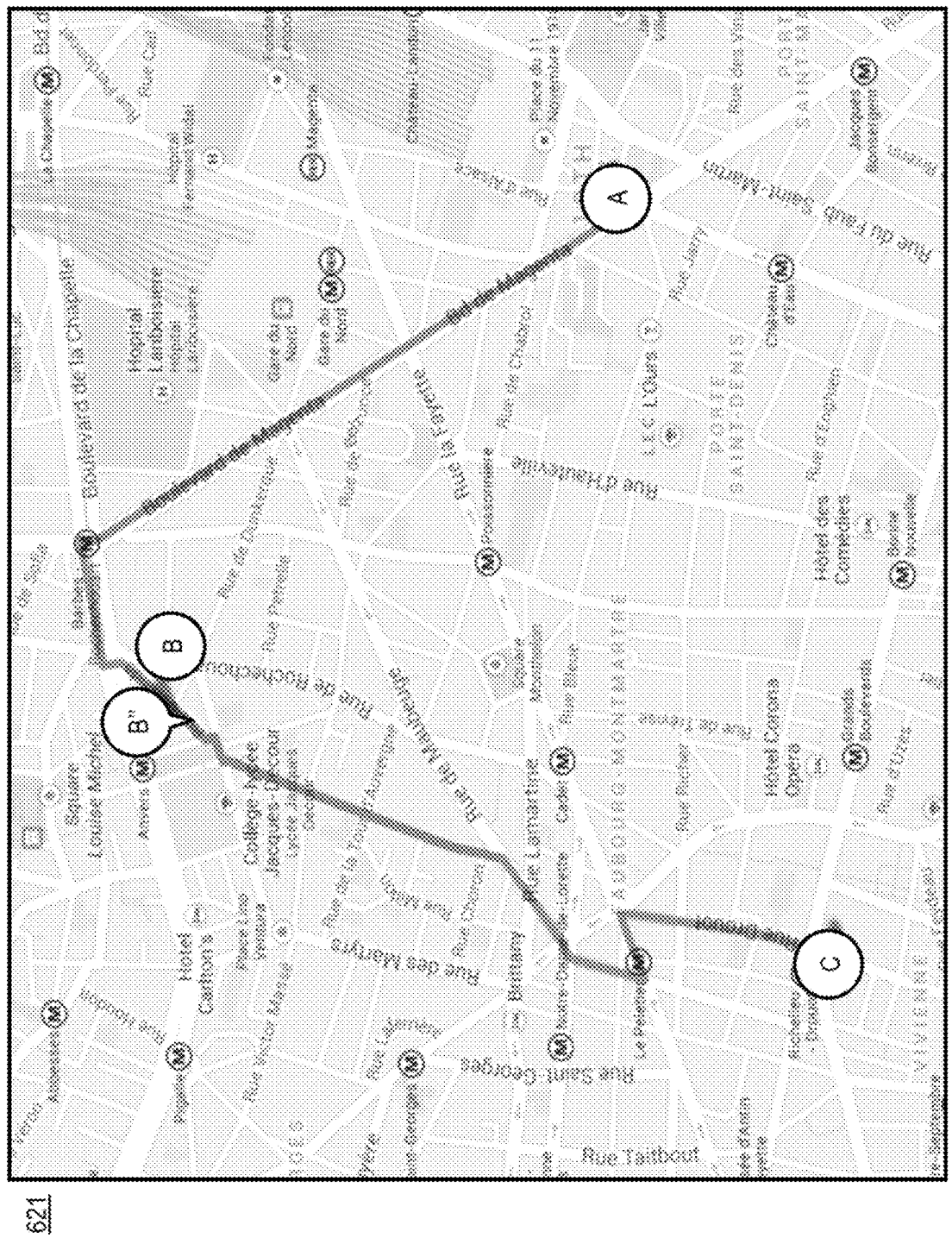
Figure 6C:
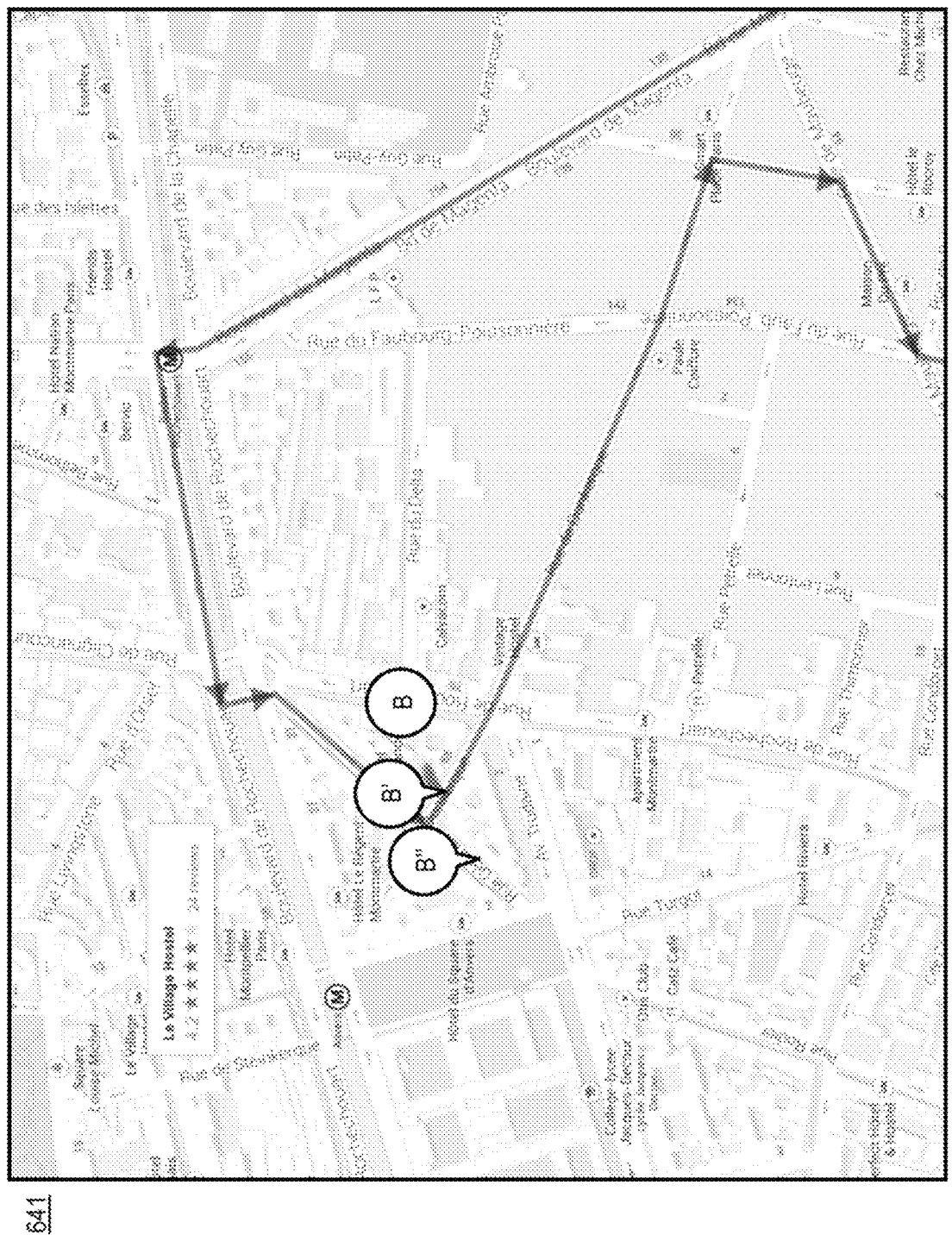

FIGS. 6A-6C are diagrams of example user interfaces associated with the process of FIG. 5, according to one embodiment. FIG. 6A illustrates a mapping UI 601 with a route generated between an origin A and a final destination C with a stopover at an intermediate destination B. In the example of FIG. 6A, the system 100 generates a parking recommendation for the stopover at intermediate destination B without considering the next destination C, and recommends parking at parking location B' closest to the intermediate destination B. However, because the parking location B' is on a one-way street leading away from the final or next destination C, the resulting route between A and C accounting for the stopover at B is 4.0 km. In contrast, FIG. 6B illustrates a mapping UI 621 with a route generated between A and C with a stopover at B that optimizes for the next destination C after B according to the embodiments described herein. As a result, the system 100 recommends a parking location B" that is a little farther from B than parking location B' but results in a route from B' to C that is more direct. The next-destination optimized route of FIG. 6B is only 3.1 km and is much shorter than the unoptimized route of FIG. 6A. FIG. 6C illustrates a close-up mapping UI 641 that provides a close up view of the parking location B' of the example of FIG. 6A and B" of FIG. 6B. As shown in mapping UI 641, B" is farther than B' from intermediate destination B, but B" provides for a more direct and shorter route to the next destination C.

Figure 6D:
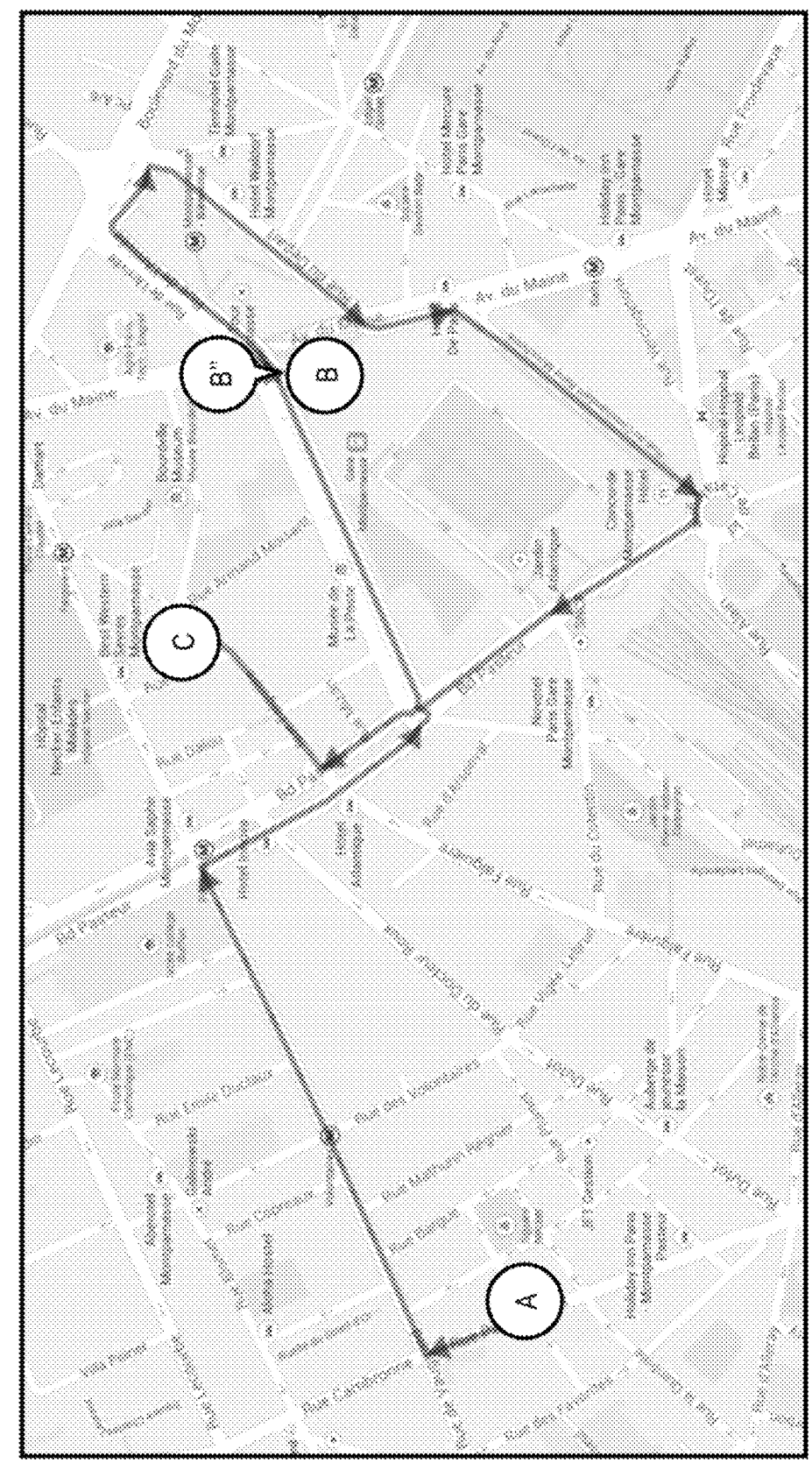
Figure 6E:
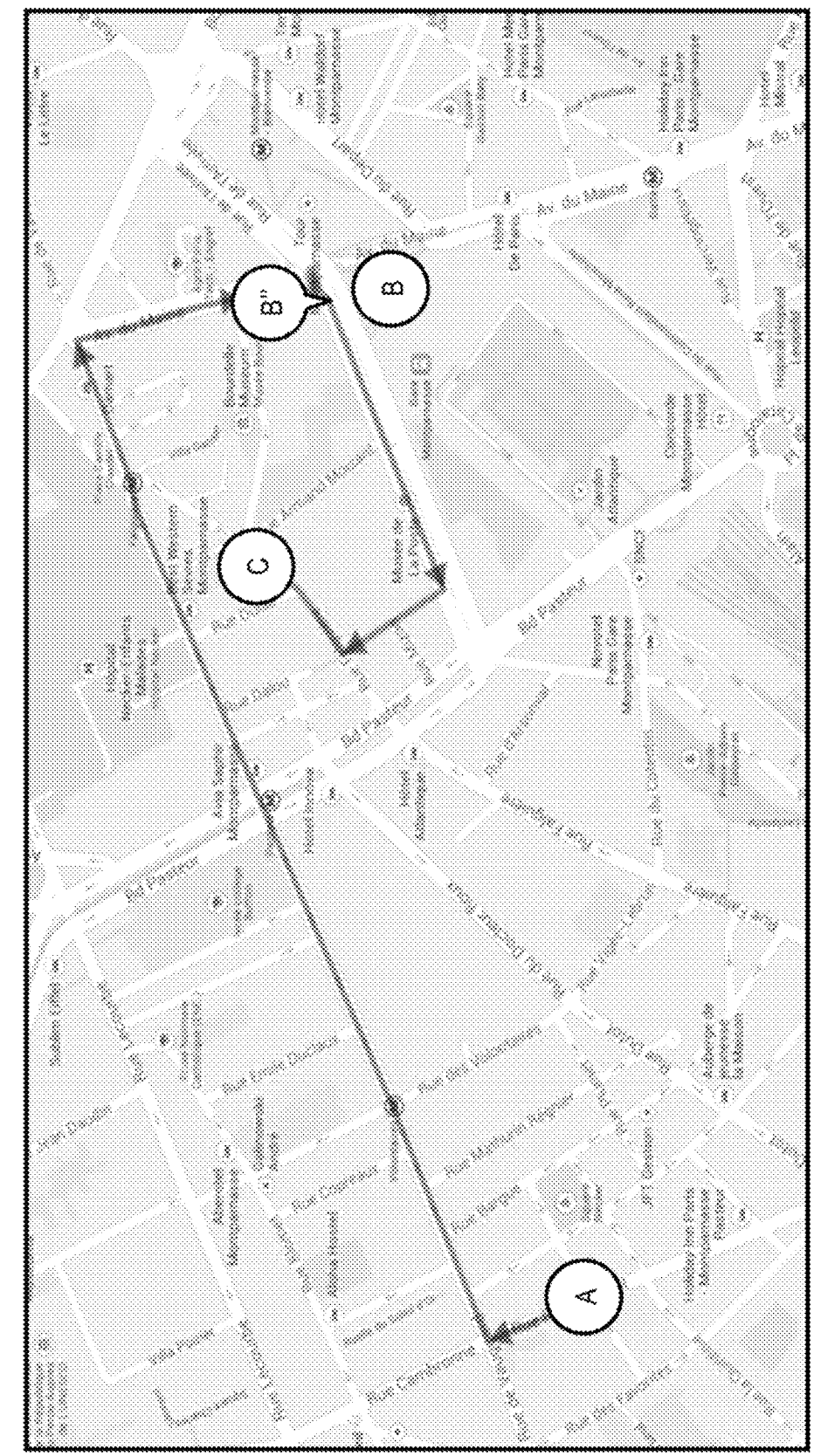

FIGS. 6D and 6E illustrate an example in which selecting a recommended parking or stopping location at a stopover can be a factor in optimizing the overall length of a travel route, according to one embodiment. As with the example of FIGS. 6A-6C above, the example of FIGS. 6D and 6C involve generating a route from A to C with a stopover a B. In the example mapping UI 661 of FIG. 6D, the system 100 has computed a parking recommendation B' at intermediate destination B without considering the next destination B. In this case, the system 100 can recommend parking on the right side of the road a parking location B' that is closest to the intermediate destination B. However, because there is a median on the road segment on which parking location B's is located with no opportunity for a U-turn because of turn restrictions and the parking direction at B' is away from the next destination C, the unoptimized route of FIG. 6D has a length of 3.6 km. In contrast, the example mapping UI 681 of FIG. 6E, the system 100 has recommended a parking location B" that has been optimized to reduce the travel distance to the next destination C. In this example, the parking location B" is on the same point in the road segment as parking location B' but on the opposite side of the road. In this case, the opposite side of the road leads towards the next destination C without having to take a long detour. As a result, the overall route length is reduced to 2.4 km from the 3.6 km length of the unoptimized route.

Figure 7:
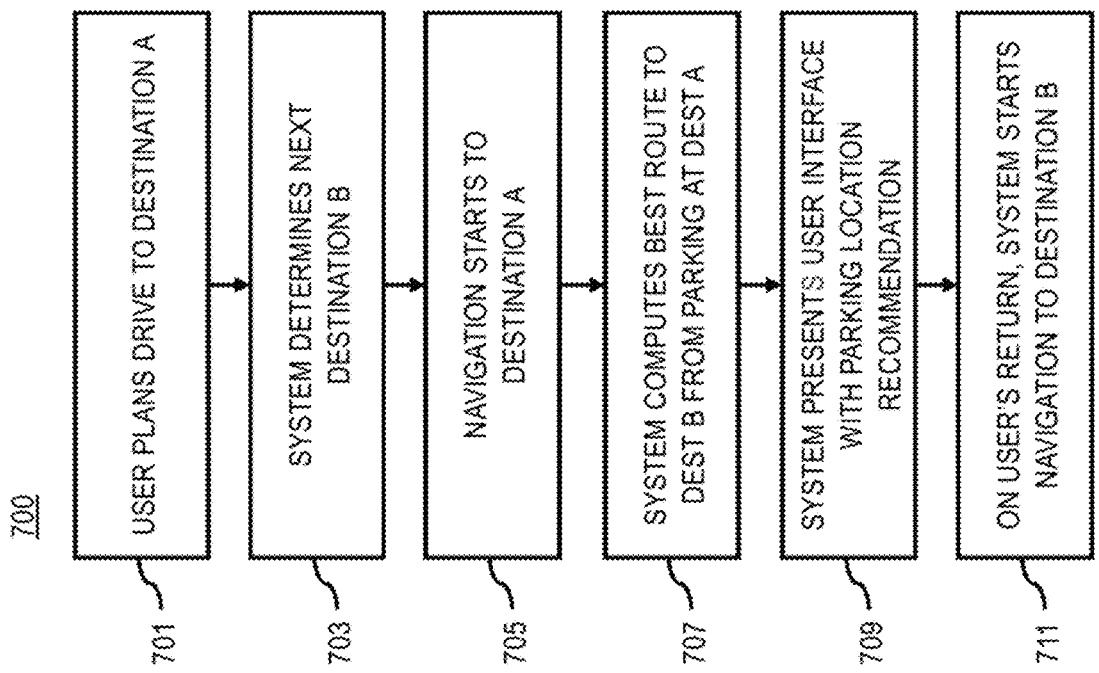
FIG. 7 is a flowchart of an example process for user interaction with the system of FIG. 1 to provide a recommended parking and/or stopping location based on a next destination, according to one embodiment.

FIG. 7 is a flowchart of an example process for user interaction with the system 100 of FIG. 1 to provide a recommended parking and/or stopping location based on a next destination, according to one embodiment. In various embodiments, the routing platform 111 and/or any of the modules 401-407 may perform one or more portions of the process 700 and may be implemented in, for instance, a chip set including a processor and a memory as shown in FIG. 13. As such, the routing platform 111 and/or any of the modules 401-407 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In step 701, a user plans a drive route to a destination A. For example, the routing platform 111 can present a navigation user interface for the user to input or specify planned route to destination A.

In step 703, the routing platform 111 determines whether the user wants to go to a destination B after destination A. For example, the routing platform 111 can ask (e.g., via a navigation user interface) the user if the user plans to go somewhere else after reaching destination A. In addition or alternatively, the routing platform 111 can predict whether the user plans to go to next destination B after destination A based on the user's mobility graph as described in the embodiments above. After determining the next destination B after destination A, the routing platform 111 starts the route and route guidance to destination A as the user begins traveling towards destination A in a vehicle (step 705).

In step 707, the routing platform 111 computes an optimized route to destination B from a recommended parking/stopping location at intermediate destination A. In one embodiment, upon arrival at destination A, approaching destination A within a threshold distance, or at the start of navigation to destination A, the routing platform 111 computes the best or optimized route (e.g., best with respect to travel time, distance, etc.) to destination B considering the need to park near destination A. Based on this upfront route computation to destination B from the parking location at destination A, the routing platform 111 recommends the most suitable parking location/area or even the best side of street next to destination A according to the embodiments described herein (e.g., by considering the driving restrictions like one-way streets, avoiding U-turn maneuvers, or the risk of hitting segment with high traffic that could be avoided by parking more smartly). In addition, the routing platform 111 can present a user interface with the parking location recommendation on arrival at the destination A, approaching destination A within a proximity threshold, at the start of navigation, etc. (step 709).

In step 711, when the user comes back to the parked vehicle at destination A, the routing platform 111 can start routing and providing navigation guidance form the parking location near destination A to the destination B with the optimized route as planned to avoid unnecessary detours from a non-optimized parking location. This, for instance, can result in avoiding potential user regrets like "if I had known that I would have to make this long detour now, I would have parked earlier on the previous route."

Figure 8:
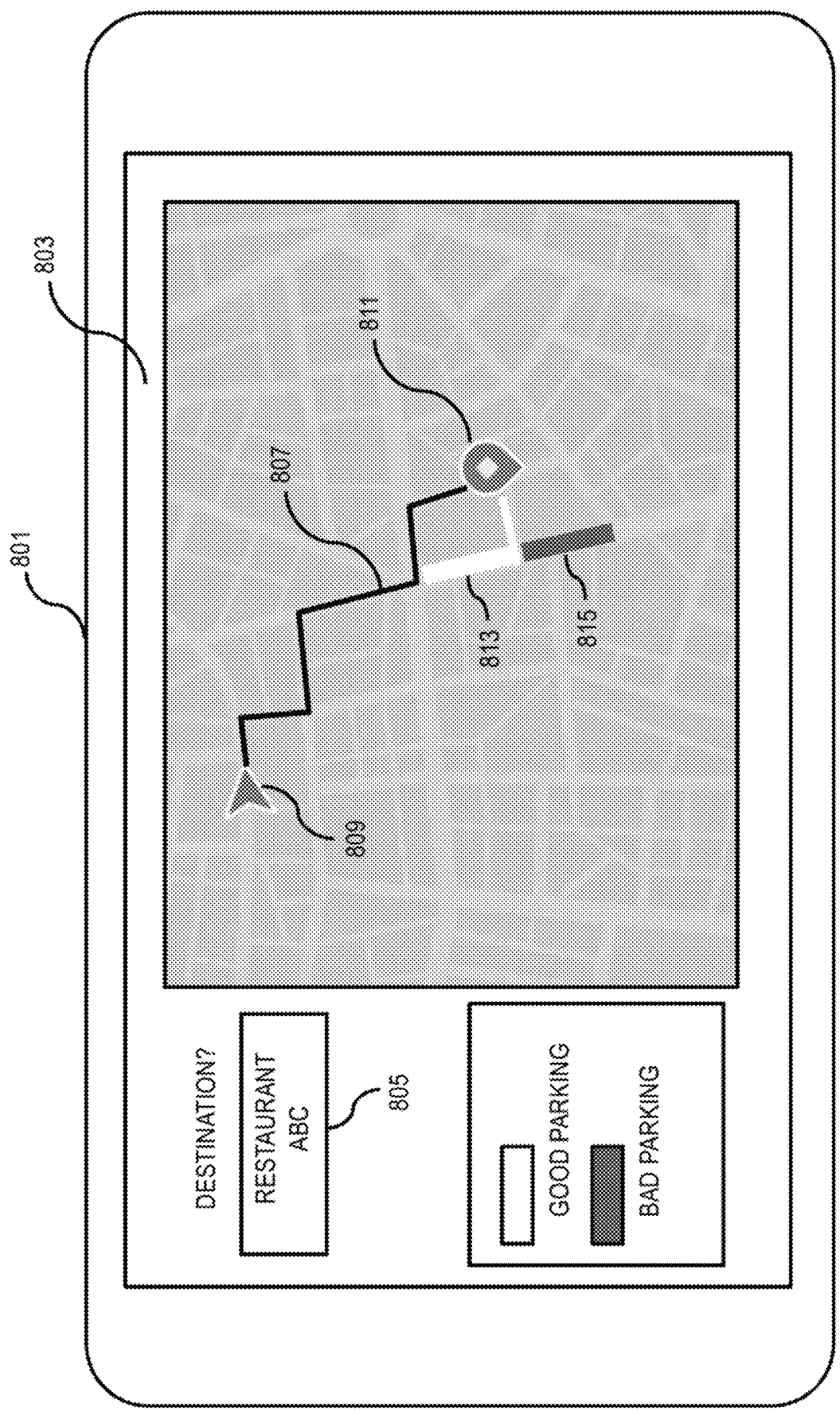
FIG. 8 is a diagram of an example user interface associated with the process of FIG. 7, according to one embodiment.

FIG. 8 is a diagram of an example user interface associated with the process of FIG. 7, according to one embodiment. The example of FIG. 8 illustrates one example for representing the travel times and/or distances from candidate parking locations at a current destination to the next destination. As shown, a navigation device 801 presents a user interface 803 with an input box 805 for specifying a destination (e.g., restaurant ABC). In one embodiment, the routing platform 111 predicts that the user will return home following dinner at Restaurant ABC and generates an optimized parking recommendation at Restaurant ABC based on the next destination being the user's home. In this example, the routing platform 111 initiates a presentation of a route 807 from the user's starting location 809 to the location 811 of the Restaurant ABC. As part of generating the optimized parking recommendation, the routing platform 111 evaluated several candidate parking locations and computed that parking locations on road segments highlighted in white (e.g., marked as good for parking) will provide for a faster return trip home that parking locations on road segments 815 highlighted in black. In other words, the user interface 803 presents different representations (e.g., colors) of the road segments 813 and 815 based on their predicted effect on travel times, distances, etc. to the next destination (e.g., home).

In one embodiment, the evaluation of the candidate parking locations for how quickly the user can reach the next destination can also be used as an input or parameter for determining a parking search route near a destination. For example, in some use cases, the routing platform 111 can generate a route for a user to take near the destination to search for available parking spots. The routing platform 111, for instance, can determine which areas are likely to have available parking (e.g., areas with a probability of finding an available parking space above a threshold value based on real-time or historical parking availability data) and then generate a route that traverses those areas until a parking space is found. In one embodiment, with all other parking search route factors (e.g., likelihood of available parking) being equal for multiple areas, the routing platform 111 can use the ranking of the candidate parking locations in those areas with respect to distance, time, etc. to the next destination to start the parking search route.

Figure 9:
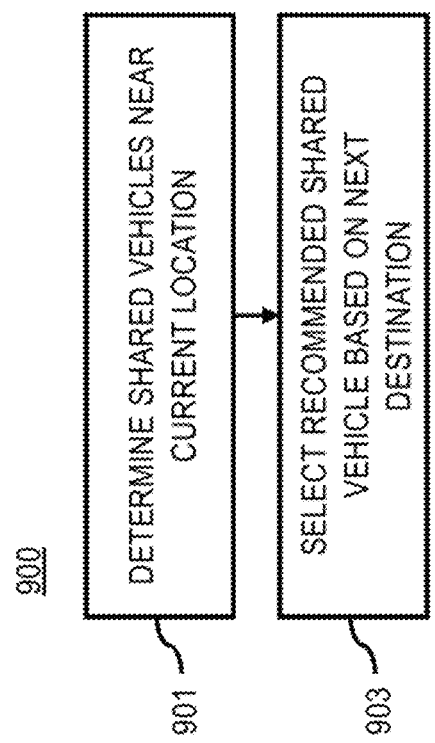
FIG. 9 is a flowchart of process for recommending a shared vehicle based on a next destination, according to one embodiment.

FIG. 9 is a flowchart of process for recommending a shared vehicle based on a next destination, according to one embodiment. In various embodiments, the routing platform 111 and/or any of the modules 401-407 may perform one or more portions of the process 900 and may be implemented in, for instance, a chip set including a processor and a memory as shown in FIG. 13. As such, the routing platform 111 and/or any of the modules 401-407 can provide means for accomplishing various parts of the process 900, as well as means for accomplishing embodiments of other processes described herein in conjunction with other components of the system 100. Although the process 900 is illustrated and described as a sequence of steps, it is contemplated that various embodiments of the process 900 may be performed in any order or combination and need not include all of the illustrated steps.

As discussed above, in one embodiment, the embodiments described herein are also applicable recommending shared vehicles (e.g., shared cars) that are within vicinity of the user considering the user's planned destination. For example, the user's current location would be equivalent to the current destination described in the process 500 of FIG. 5, the user's planned destination for the shared vehicle would be equivalent to the next destination, and the locations of the nearby shared vehicles would be equivalent to the candidate parking or stopping locations.

Accordingly, in step 901, the routing platform 111 determines a plurality of shared vehicles within a proximity threshold of the current location of the user searching for a shared vehicle. For example, the routing platform 111 can query a mobility provider for the location of shared vehicles and present the locations on a mapping user interface. The shared vehicle can be any type of vehicle operated by a mobility service provider including but not limited to cars, bicycles, scooters, etc. Typically, mobility service providers provide a fleet of vehicles within a service area in which users can check out or check in at any parking location. Shared vehicles are typically well dispersed within their respective service areas to provide convenient access by users. When searching available sheared vehicles, a user would use an application to view nearby vehicles (e.g., within a proximity threshold) and the closest vehicles will be presented first for the user to choose from regardless of the user's intended destination (i.e., the next destination of the shared vehicle).

However, according to the embodiments described herein, in step 903, the routing platform 111 can optimize the selection of the recommended shared vehicle to present to a user based on the user's intended destination (e.g., the next destination). In other words, the routing platform 111 determines a recommended shared vehicle from the plurality of nearby shared vehicles based on minimizing a travel time, travel distance, and/or other routing engine cost parameter between the parking locations of the shared vehicles and the next or user's intended destination. In one embodiment, the routing platform 111 can consider the same parameters as described above with respect to optimizing parking locations based on the next destination. For example, the recommended shared vehicle can be determined based on determining that the parking location indicates that the recommended shared vehicle is parked in a direction leading towards the next destination. The recommended shared vehicle can also be determined based on determining that the parking location indicates that the recommended shared vehicle is parked on a side of a road segment with a travel direction leading towards the next destination. In yet another embodiment, the recommended shared vehicle can be determined based on a total time comprising (1) an initial travel time, an initial travel distance, or a combination thereof between the current location and the parking location of the recommended shared vehicle; and (2) the travel time, the travel distance, or a combination thereof between the parking location of the recommended shared vehicle and the next or user's intended destination.

Figure 10:
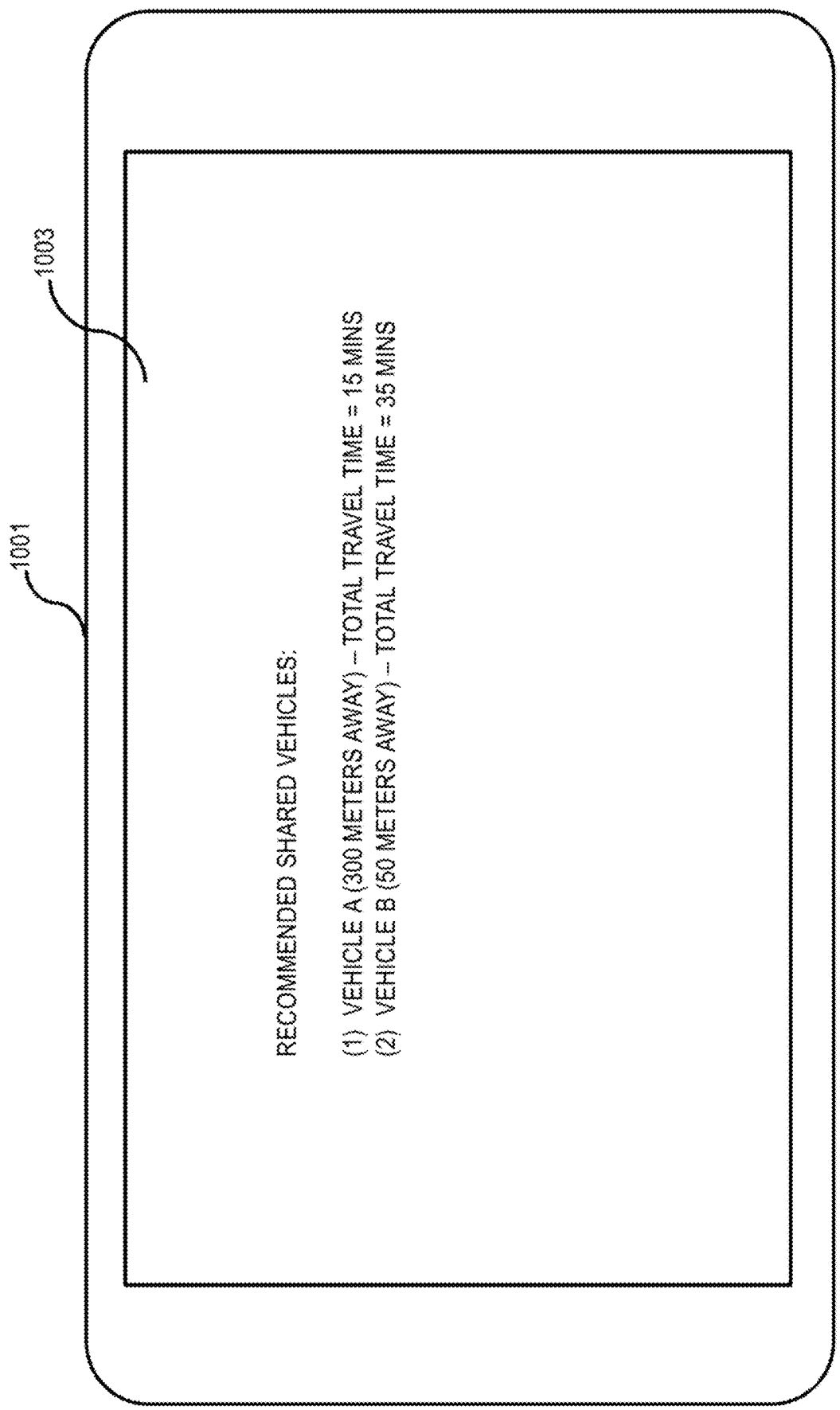
FIG. 10 is a diagram of an example user interface associated with the process of FIG. 9, according to one embodiment.

In other words, the routing platform would not recommend a closer shared vehicle that will force the user to make a big detour or longer drive because of where the shared vehicle is parked (e.g., on the wrong side of a street where the next possibility to make a U-turn is quite far). Thus, the available shared vehicles could be ranked and presented not based on proximity of a given vehicle but based on the overall estimated travel time (e.g., time to walk to the car and time to complete the drive to the destination) as shown in FIG. 10. In the example of FIG. 10, the routing platform initiates a presentation of a UI 1003 on a device 1001 that ranks a recommends nearby shared vehicles to a user. In this example, the routing platform 111 has found shared vehicle A (at 300 meters away from the user) and shared vehicle B (at 50 meters away). After evaluating the travel time to the user's intended destination, the routing platform 111 has ranked and recommended shared vehicle A over shared vehicle B because the travel time from vehicle A's parked location to the destination plus walking time to the car is 15 minutes versus the travel time from vehicle B's parked location to the destination plus walking time to the car of 35 minutes.

Returning to FIG. 1, the system 100 of FIG. 1 includes one or more vehicles 101 configured with one or more vehicle sensors 103 (e.g., a global positioning system (GPS) sensor), one or more UEs 105 (e.g., an embedded navigation system, a mobile device, a smartphone, etc.) having connectivity to the routing platform 111 via a communication network 119. In one embodiment, the UEs 105 can be associated with any of the vehicles 101 or a user or driver of a vehicle 101. By way of example, the UEs 105 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 105 can support any type of interface to the user (such as "wearable" circuitry, etc.). In one embodiment, the one or more vehicles 101 may have cellular or wireless fidelity (Wi-Fi) connection either through the inbuilt communication equipment or from a UE 105 associated with the vehicles 101. Also, the UEs 105 may be configured to access the communication network 119 by way of any known or still developing communication protocols. In one embodiment, the UEs 105 may include the routing platform 111 to optimizing parking and/or stopping locations at a current destination based on a next destination.

In one embodiment, the routing platform 111 performs the process for optimizing vehicle parking/stopping locations based on a next destination as discussed with respect to the various embodiments described herein. In one embodiment, the routing platform 111 can be a standalone server or a component of another device with connectivity to the communication network 119. For example, the component can be part of an edge computing network where remote computing devices (not shown) are installed along or within proximity of an intended destination (e.g., a city center). In one embodiment, the routing platform 111 has connectivity over the communication network 119 to the services platform 113 (e.g., an OEM platform) that provides one or more services 115 (e.g., mapping/routing services). By way of example, the services 115 may also be other third-party services and include mapping services, navigation services, parking services, travel planning services, notification services, social networking services, content (e.g., audio, video, images, etc.) provisioning services, application services, storage services, contextual information determination services, location-based services, information-based services (e.g., weather, news, etc.), etc.

In one embodiment, content providers 117a-117k (also collectively referred to herein as content providers 117) may provide content or data (e.g., navigation-based content such as destination information, routing instructions, POI data, historical data, mobility graphs, etc.) to the vehicles 101, the routing platform 111, the UEs 105, the applications 107, the geographic database 109, the services platform 113, and the services 115. The content provided may be any type of content, such as map content, contextual content, audio content, video content, image content, etc. In one embodiment, the content providers 117 may also store content associated with the vehicles 101, the UEs 105, the routing platform 111, the applications 107, the geographic database 109, the services platform 113, and/or the services 115. In another embodiment, the content providers 117 may manage access to a central repository of data, and offer a consistent, standard interface to data, such as a repository of the geographic database 109.

By way of example, the vehicle sensors 103 may be any type of sensor. In certain embodiments, the vehicle sensors 103 may include, for example, a global positioning system (GPS) sensor for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., lights or exhaust associated with a vehicle 101 about to leave a parking spot), velocity sensors, and the like. In another embodiment, the vehicle sensors 103 may include sensors (e.g., mounted along a perimeter of the vehicle 101) to detect the relative distance of the vehicle from lanes or roadways, the presence of other vehicles 101, pedestrians, animals, traffic lights, road features (e.g., curves) and any other objects, or a combination thereof. In one scenario, the vehicle sensors 103 may detect weather data, traffic information, or a combination thereof. In one example embodiment, the vehicles 101 may include GPS receivers to obtain geographic coordinates from satellites 121 for determining current or live location and time. Further, the location can be determined by a triangulation system such as A-GPS, Cell of Origin, or other location extrapolation technologies when cellular or network signals are available. In another example embodiment, the services 115 may provide in-vehicle navigation services.

The communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the routing platform 111 may be a platform with multiple interconnected components. By way of example, the routing platform 111 may include multiple servers, intelligent networking devices, computing devices, components and corresponding software for optimizing vehicle parking or stopping locations based on a next destination. In addition, it is noted that the routing platform 111 may be a separate entity of the system 100, a part of the services platform 113, the one or more services 115, or the content providers 117.

In one embodiment, the geographic database 109 stores information regarding parking spot availability in a zone around or a threshold from a destination (e.g., available parking location, historic parking probability data, parking restriction data, etc.). In one instance, the geographic database 109 also stores driving situation data (e.g., historic or current traffic levels) and walking distance (e.g., average walk times). The information may be any of multiple types of information that can provide means for providing navigation-based content (e.g., a parking search route). In another embodiment, the geographic database 109 may be in a cloud and/or in a vehicle 101, a UE 105, or a combination thereof.

By way of example, the vehicles 101, the UEs 105, the routing platform 111, the applications 107, the geographic database 109, the services platform 113, the services 115, and the content providers 117 communicate with each other and other components of the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
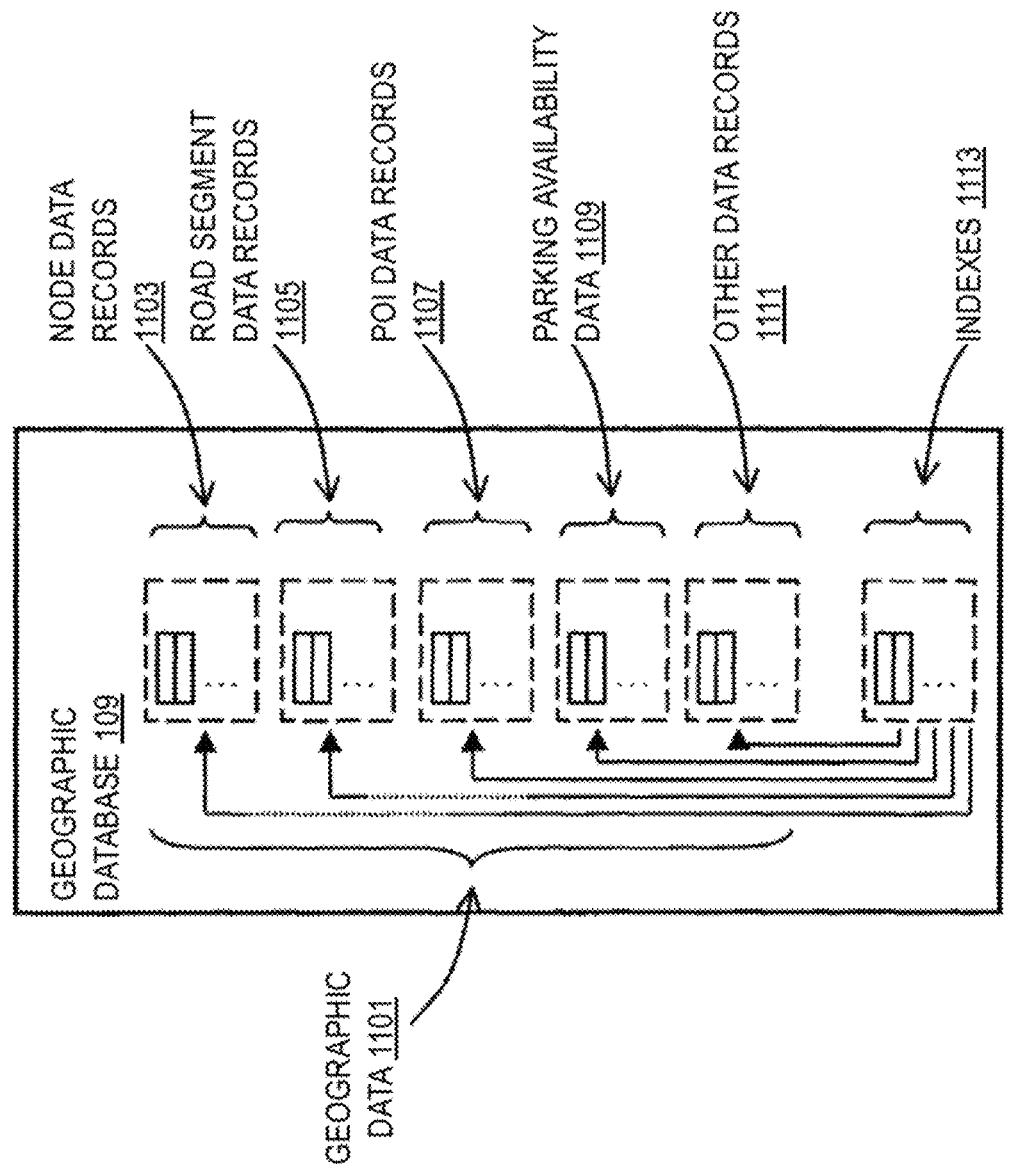
FIG. 11 is a diagram of a geographic database, according to one embodiment.

FIG. 11 is a diagram of the geographic database 109, according to one embodiment. In one embodiment, parking search route information, parking spot availability data, and/or any other information used or generated by the system 100 with respect to presenting to a user of a vehicle a representation of parking or stopping location optimized based on a next destination can be stored, associated with, and/or linked to the geographic database 109 or data thereof. In one embodiment, the geographic or map database 109 includes geographic data 1101 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 109 includes node data records 1103, road segment or link data records 1105, POI data records 1107, parking data records 1109, other data records 1111, and indexes 1113, for example. More, fewer or different data records can be provided. In one embodiment, the other data records 1111 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 1107 may also include information on locations of traffic controls (e.g., stoplights, stop signs, crossings, etc.), driving restrictions (e.g., speed, direction of travel, etc.), or a combination thereof.

In exemplary embodiments, the road segment data records 1105 are links or segments representing roads, streets, or paths, as can be used in calculating a likelihood of overlap, intersection, or looping between two or more route segments. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 109 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gas or petrol stations, hotels, restaurants, museums, stadiums, offices, shopping centers or malls, parking lots, automobile dealerships, auto repair shops, buildings, stores, parks, etc. The geographic database 109 can include data about the POIs and their respective locations in the POI data records 1107 (e.g., proximity of convenient available parking such as an attached parking lot or parking structure). The geographic database 109 can also include data about places, such as cities, city centers, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the parking data records 1109 can include any data item used to detect or identify parking spaces, available parking spaces, or a combination thereof. In one instance, the parking data records 1109 can also include any data related to a vehicle in a parking space (e.g., time of parking, time remaining on a meter, etc.). In one embodiment, the parking data records 1109 in connection with the road segment data records 1105 or separately can include any data item use to detect or identify a probability value to find a parking space on a road or segment (e.g., a historic value, a current value, or a combination thereof).

The geographic database 109 can be maintained by the content providers 117 in association with the services platform 113 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., a UE 105) to provide navigation-related functions. For example, the geographic database 109 can be used with the end user device to provide an end user with navigation features (e.g., a parking search route). In such a case, the geographic database 109 can be downloaded or stored on the end user device, such as in an application 107, or the end user device can access the geographic database 109 through a wireless or wired connection (such as via a server and/or the communication network 119), for example.

The processes described herein for providing a recommended vehicle or parking or stopping location at a current destination based on a next destination may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
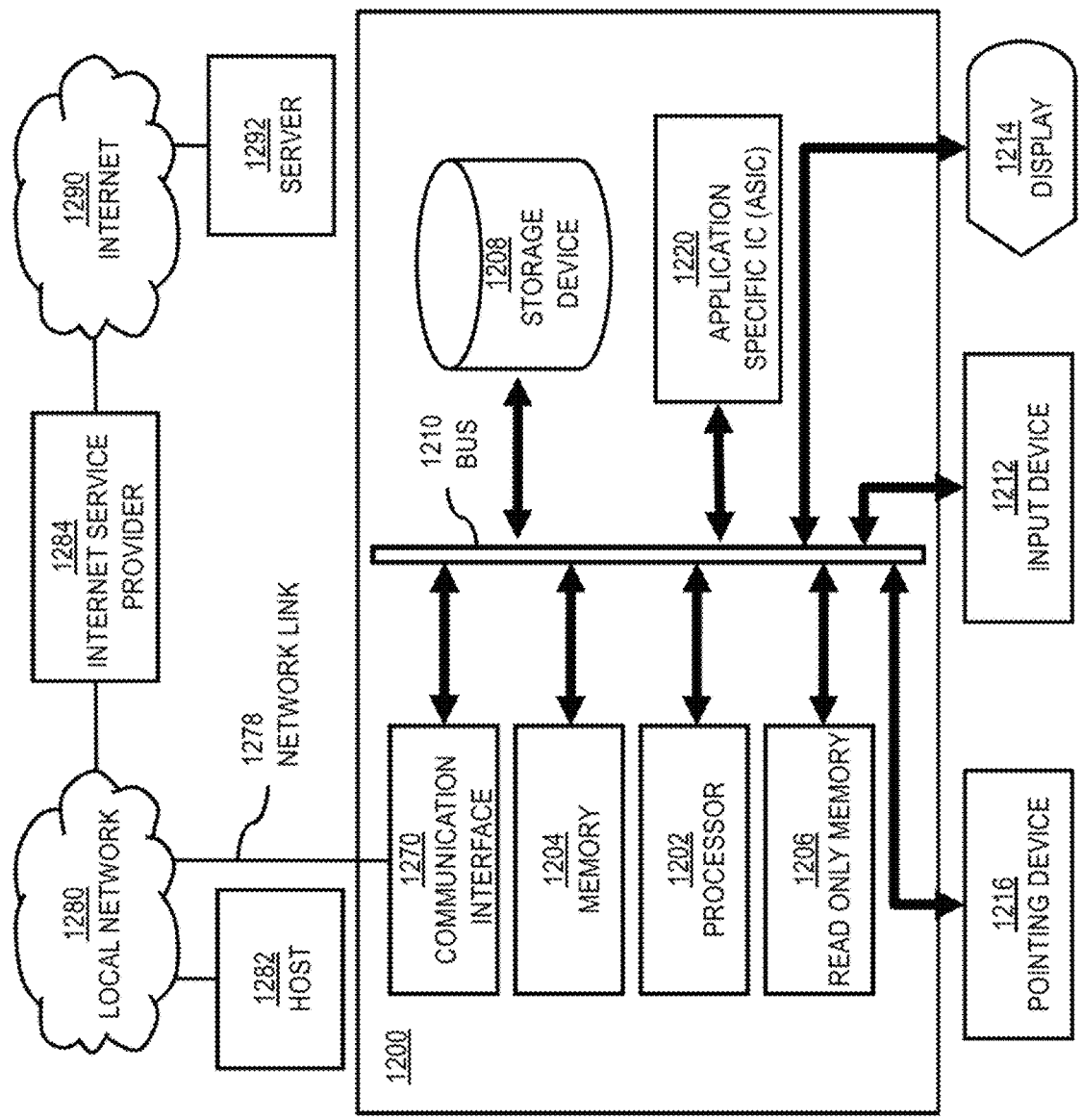
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to provide a recommended vehicle or parking or stopping location at a current destination based on a next destination as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing a recommended vehicle or parking or stopping location at a current destination based on a next destination. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing a recommended vehicle or parking or stopping location at a current destination based on a next destination. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing a recommended vehicle or parking or stopping location at a current destination based on a next destination, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general, the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 119 for providing a recommended vehicle or parking or stopping location at a current destination based on a next destination.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 13 illustrates a chip set 1300 upon which an embodiment of the invention may be implemented. Chip set 1300 is programmed to provide a recommended vehicle or parking or stopping location at a current destination based on a next destination as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide a recommended vehicle or parking or stopping location at a current destination based on a next destination. The memory 1305 also stores the data associated with or generated by the execution of the inventive steps.

Figure 14:
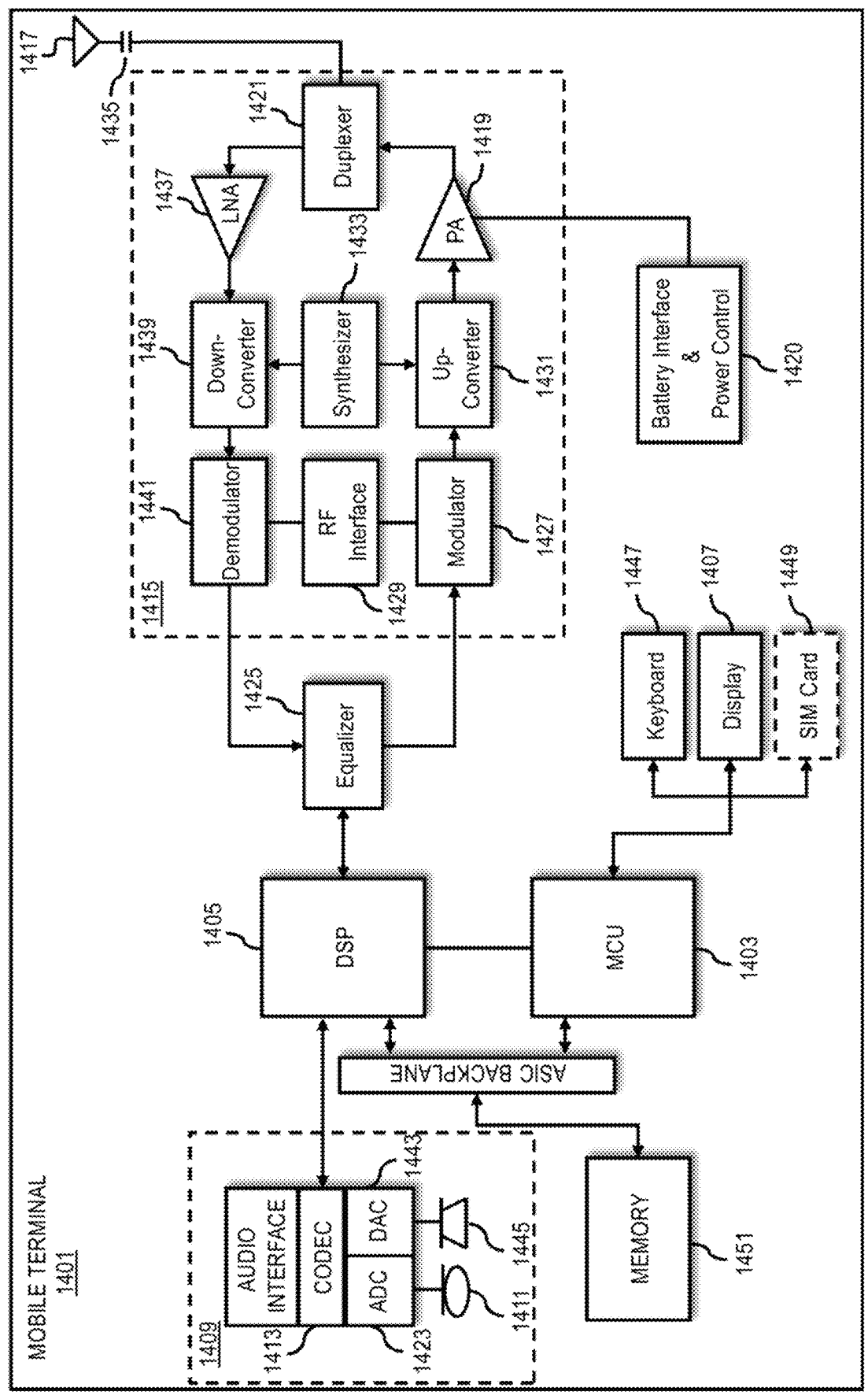
FIG. 14 is a diagram of a mobile terminal (e.g., handset or vehicle or part thereof) that can be used to implement an embodiment.

FIG. 14 is a diagram of exemplary components of a mobile terminal 1401 (e.g., a UE 105 or vehicle 101 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide a recommended vehicle or parking or stopping location at a current destination based on a next destination. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for computing a recommended parking location at a current destination based on a next destination comprising:
    processing historical mobility data associated with a user, wherein the historical mobility data specify a plurality of locations traveled by the user;
    predicting the next destination that follows the current destination based on the historical mobility data;
    determining, in real-time, availability information for the recommended parking location based on historical parking availability data of the recommended parking location and contextual information of the user, wherein the contextual information include expected time of arrival at the current destination, expected total duration at the current destination, expected departure from the current destination to the next destination, or a combination thereof;
    processing map data representing a road network within a proximity threshold of the current destination to determine the recommended parking location based on minimizing a travel time, a travel distance, or a combination thereof between the recommended parking location and the next destination; and
    presenting routing information towards the recommended parking location in a user interface of a device associated with the user.

2. A computer-implemented method for computing a recommended parking location at a current destination based on a next destination comprising:
    processing historical mobility data associated with a user, wherein the historical mobility data specify a plurality of locations traveled by the user;
    predicting the next destination that follows the current destination based on the historical mobility data;
    processing map data representing a road network within a proximity threshold of the current destination to determine the recommended parking location based on minimizing a travel time, a travel distance, or a combination thereof between the recommended parking location and the next destination; and
    presenting routing information towards the recommended parking location in a user interface of a device associated with the user,
    wherein the recommended parking location is on one or more one-way road segments,
    the one or more one-way road segments being selected based on determining that the one or more one-way road segments have a direction of travel that leads towards the next destination and has a lesser travel time, lesser travel distance, or a combination thereof towards the next destination compared to other candidate road segments,
    wherein the direction of travel is within a threshold angular range of a direct line from the recommended parking location to the next destination.

3. The method of claim 1, wherein the recommended parking location is selected to have a direction of parking that leads towards the next destination, and wherein the direction of parking includes pointing direction of a front of a parked vehicle.

4. The method of claim 1, further comprising:
    processing user profile information, user preference information, or a combination thereof to determine a threshold walking distance for the user,
    wherein the recommended parking location is further based on the threshold walking distance between the recommended parking location and the current destination.

5. The method of claim 1, further comprising:
    determining one or more turn restrictions between the recommended parking location and the next destination that results in an increased travel time, increased travel distance, or a combination thereof; and
    selecting the recommended parking location with a route that minimizes or avoids the one or more turn restrictions to the next destination.

6. The method of claim 1, further comprising:
    determining the recommended parking location with a shortest route to the next destination;
    determining, in real-time, one or more traffic incidents in the shortest route that increases the travel time, the travel distance, or a combination thereof; and
    selecting another parking location with a route that take less travel time over the recommended parking location.

7. The method of claim 1, further comprising:
    initiating the determining of the recommended parking location, a presentation of the recommended parking location, or a combination thereof based on determining that a user is within a threshold distance of the current destination.

8. The method of claim 1, wherein the minimizing of the travel time, the travel distance, or a combination thereof between the recommended parking location and the next destination is computed for an estimated time at which a user is predicted to initiate a journey from the current destination to the next destination.

9. The method of claim 1, wherein the user interface includes a representation of the travel distance, the travel time, or a combination of the recommended parking location, one or more other parking locations, or a combination thereof.

10. An apparatus for computing a recommended shared vehicle at a current location based on a next destination comprising:
at least one processor; and
at least one memory including computer program code for one or more programs,
the at least one memory and the computer program code configured to, with the at least one processor, cause the apparatus to perform at least the following,
process historical mobility data associated with a user, wherein the historical mobility data specify a plurality of locations traveled by the user;
predict the next destination that follows the current location based on the historical mobility data;
determine a plurality of shared vehicles within a proximity threshold of the current location;
determine, in real-time, availability information for the recommended shared vehicle based on historical parking availability data of the recommended shared vehicle and contextual information of the user, wherein the contextual information include expected time of arrival at the current destination, expected total duration at the current destination, expected departure from the current destination to the next destination, or a combination thereof;
determine the recommended shared vehicle from the plurality of shared vehicles based on minimizing a travel time, a travel distance, or a combination thereof between a parking location of the recommended shared vehicle and the next destination; and
present location of the recommended shared vehicle in a user interface of a device associated with the user.

11. The apparatus of claim 10, wherein the recommended shared vehicle is determined based on determining that the parking location indicates that the recommended shared vehicle is parked in a direction leading towards the next destination.

12. The apparatus of claim 10, wherein the recommended shared vehicle is determined based on determining that the parking location indicates that the recommended shared vehicle is parked on a side of a road segment with a travel direction leading towards the next destination.

13. The apparatus of claim 10, wherein the recommended shared vehicle is a determined based on a total time comprising:
an initial travel time, an initial travel distance, or a combination thereof between the current location and the parking location of the recommended shared vehicle; and
the travel time, the travel distance, or a combination thereof between the parking location of the recommended shared vehicle and the next destination.

14. The apparatus of claim 10, wherein the proximity threshold is based on a maximum walking distance associated with a user, and wherein the maximum walking distance is based on user profile information, user preference information, or a combination thereof.

15. A non-transitory computer-readable storage medium for computing a recommended vehicle stopping location at a current destination based on a next destination, carrying one or more sequences of one or more instructions which, when executed by one or more processors, cause an apparatus to at least perform the following steps:
processing historical mobility data associated with a user, wherein the historical mobility data specify a plurality of locations traveled by the user;
predicting the next destination that follows the current destination based on the historical mobility data;
determining, in real-time, availability information for the recommended vehicle stopping location based on historical parking availability data of the recommended vehicle stopping location and contextual information of the user, wherein the contextual information include expected time of arrival at the current destination, expected total duration at the current destination, expected departure from the current destination to the next destination, or a combination thereof;
processing map data representing a road network within a proximity threshold of the current destination to determine the recommended vehicle stopping location based on minimizing a travel time, a travel distance, or a combination thereof between the recommended vehicle stopping location and the next destination; and
presenting routing information towards the recommended parking location in a user interface of a device associated with the user.

16. The non-transitory computer-readable storage medium of claim 15, wherein the recommended vehicle stopping location is a parking location, a pick-up location, a drop-off location, or a combination thereof.

17. The non-transitory computer-readable storage medium of claim 15, wherein the recommended parking location is selected to have a direction of parking that leads towards the next destination, and wherein the direction of parking includes pointing direction of a front of a parked vehicle.

18. A non-transitory computer-readable storage medium for computing a recommended vehicle stopping location at a current destination based on a next destination, carrying one or more sequences of one or more instructions which, when executed by one or more processors, cause an apparatus to at least perform the following steps:
processing historical mobility data associated with a user, wherein the historical mobility data specify a plurality of locations traveled by the user;
predicting the next destination that follows the current destination based on the historical mobility data;
processing map data representing a road network within a proximity threshold of the current destination to determine the recommended vehicle stopping location based on minimizing a travel time, a travel distance, or a combination thereof between the recommended vehicle stopping location and the next destination; and
presenting routing information towards the recommended parking location in a user interface of a device associated with the user,
wherein the recommended parking location is on one or more one-way road segments, the one or more one-way road segments being selected based on determining that the one or more one-way road segments have a direction of travel that leads towards the next destination and has a lesser travel time, lesser travel distance, or a combination thereof towards the next destination compared to other candidate road segments, wherein the direction of travel is within a threshold angular range of a direct line from the recommended parking location to the next destination.

* * * * *